(12) United States Patent
Turner et al.

(10) Patent No.: US 11,436,550 B2
(45) Date of Patent: Sep. 6, 2022

(54) CASH FORECAST SYSTEM, APPARATUS, AND METHOD

(71) Applicant: Trovata, Inc., San Diego, CA (US)

(72) Inventors: Brett P Turner, San Diego, CA (US); Joseph Drambarean, San Diego, CA (US); Francisco PerezLeon, San Diego, CA (US); Ryan Voris, San Diego, CA (US)

(73) Assignee: Trovata, Inc., San Diego, CA (US)

( * ) Notice: Subject to any disclaimer, the term of this patent is extended or adjusted under 35 U.S.C. 154(b) by 240 days.

(21) Appl. No.: 16/875,865

(22) Filed: May 15, 2020

(65) Prior Publication Data

US 2020/0279198 A1    Sep. 3, 2020

Related U.S. Application Data

(63) Continuation-in-part of application No. 15/828,254, filed on Nov. 30, 2017, now abandoned.

(60) Provisional application No. 62/955,242, filed on Dec. 30, 2019, provisional application No. 62/923,349, filed on Oct. 18, 2019, provisional application No. 62/429,002, filed on Dec. 1, 2016.

(51) Int. Cl.
| | |
|---|---|
| *G06Q 10/06* | (2012.01) |
| *G06Q 10/04* | (2012.01) |
| *G06Q 30/02* | (2012.01) |
| *H04L 67/10* | (2022.01) |
| *G06Q 40/00* | (2012.01) |
| *G06Q 40/02* | (2012.01) |
| *G06Q 40/06* | (2012.01) |

(52) U.S. Cl.
CPC ......... *G06Q 10/067* (2013.01); *G06Q 10/04* (2013.01); *G06Q 10/0631* (2013.01); *G06Q 30/0201* (2013.01); *G06Q 30/0202* (2013.01); *G06Q 40/02* (2013.01); *G06Q 40/06* (2013.01); *G06Q 40/12* (2013.12); *H04L 67/10* (2013.01)

(58) Field of Classification Search
None
See application file for complete search history.

(56) References Cited

U.S. PATENT DOCUMENTS

| | | | |
|---|---|---|---|
| 6,411,974 | B1 | 6/2002 | Graham et al. |
| 7,243,156 | B2 | 7/2007 | Hahn et al. |
| 7,835,976 | B2 | 11/2010 | Hagerman et al. |
| 8,099,354 | B2 | 1/2012 | Hagerman et al. |
| 8,190,504 | B1 | 5/2012 | Stolz et al. |
| 8,583,053 | B1 | 11/2013 | Mahbod et al. |

(Continued)

FOREIGN PATENT DOCUMENTS

WO    2013011545 A1    1/2013

*Primary Examiner* — Narayanswamy Subramanian
(74) *Attorney, Agent, or Firm* — Rowan TELS LLC

(57) ABSTRACT

A system includes a cash management module and a cash forecast module. The cash management module determines a cash position for a company based on at least financial transactions and ERP system financial data. The cash forecast module generates a cash forecast based on the cash position and one or more cash streams, each cash flow stream configured to represent a cash flow for one aspect of the company and each cash flow stream comprising zero or one or more factors, each factor configured to affect an associated cash flow stream in the future. A cash forecast may include zero or more levers.

5 Claims, 12 Drawing Sheets

(56) References Cited

U.S. PATENT DOCUMENTS

| | | | |
|---|---|---|---|
| 8,676,689 B1* | 3/2014 | Whelan | G06Q 40/12 |
| | | | 705/36 R |
| 2004/0153504 A1 | 8/2004 | Hutchinson et al. | |
| 2005/0018784 A1 | 1/2005 | Kurobe et al. | |
| 2006/0095367 A1 | 5/2006 | Iverson | |
| 2009/0276419 A1 | 11/2009 | Jones et al. | |
| 2010/0131424 A1 | 5/2010 | Mosé et al. | |
| 2012/0123872 A1 | 5/2012 | Chiu et al. | |
| 2013/0159832 A1 | 6/2013 | Ingargiola et al. | |
| 2013/0262394 A1 | 10/2013 | Kumarasamy et al. | |
| 2015/0032506 A1 | 1/2015 | Kim et al. | |
| 2015/0082218 A1 | 3/2015 | Affoneh et al. | |
| 2015/0348067 A1 | 12/2015 | Deegan et al. | |
| 2016/0019504 A1 | 1/2016 | Ghosh | |
| 2017/0053344 A1* | 2/2017 | Yaplee | G06Q 40/00 |
| 2017/0103468 A1 | 4/2017 | Orsini et al. | |
| 2017/0178154 A1 | 6/2017 | Wegener et al. | |
| 2017/0236119 A1 | 8/2017 | Kamensky et al. | |
| 2017/0323394 A1 | 11/2017 | Campione | |
| 2018/0158146 A1 | 6/2018 | Turner et al. | |
| 2021/0142399 A1* | 5/2021 | Joliveau | G06K 9/6223 |
| 2022/0147895 A1* | 5/2022 | Katz | G06F 16/26 |

* cited by examiner

CASH FORECAST SYSTEM, APPARATUS, AND METHOD

CROSS REFERENCE TO RELATED APPLICATIONS

This application claims priority and benefit as a continuation-in-part of U.S. application Ser. No. 15/828,254, filed on Nov. 30, 2017, and application Ser. No. 15/828,254 claims priority under 35 U.S.C. 119(e) to U.S. Provisional application Ser. No. 62/429,002, filed on Dec. 1, 2016, the contents each of which are incorporated herein by reference in their entirety. This application also claims priority and benefit under 35 U.S.C. 119(e) to U.S. Provisional application Ser. No. 62/923,349, filed on Oct. 18, 2019, the contents of which are also incorporated herein by reference in their entirety. This application also claims priority and benefit under 35 U.S.C. 119(e) to U.S. Provisional application Ser. No. 62/955,242, filed on Dec. 30, 2019, the contents of which are also incorporated herein by reference in their entirety.

BACKGROUND

An enterprise has three primary financial operating functions: Accounting; Financial Planning and Analysis (FP&A); and Treasury. Generally, accounting compiles historical financial performance following standards as provided by generally accepted accounting principles (GAAP). FP&A analyzes and produces forward-looking financial assessments forecasting cash positions, trends, and financial projections. Finally, treasury uses the information provided by accounting and FP&A, along with external market data, to optimize cash liquidity and yield on investments, while managing risk. The term "cash position" refers to the amount of cash that a company, entity or, financial institution holds on its books at a specific point in time. The term "financial institution" refers to a company engaged in the business of dealing with financial and monetary transactions such as deposits, loans, investments, and currency exchange. Financial institutions encompass a broad range of business operations within the financial services sector including banks, trust companies, insurance companies, brokerage firms, investment dealers, and the like. (Search "financial institution" investopedia.com. Sep. 25, 2019. Accessed Oct. 18, 2019.) financial institutions may be referred to herein as banks. In certain embodiments, a cash position is as current, temporally, as the financial institutions that hold the cash will disclose with respect to the most recent transactions on a cash account. In other words, if the financial institution does not report cash transactions that are presently unsettled, then those unsettled cash transactions will not be reflected in the cash position. Of course, once the unsettled cash transactions settle in the future, then those cash transactions will be reflected in the cash position reported at that future time. In addition to cash, it also takes highly liquid assets such as marketable securities, Certificate of deposit and other cash equivalents into account. (Search "cash position" on mbaskool.com Sep. 19, 2019. Accessed Oct. 21, 2019).

While these three functions have many interdependencies, they generally operate separately from one another as the skills required to perform the duties of each function are different. As a result, the systems used by each, and the many workflows to produce desired results for each, can be disparate and involve manual processes. Most companies still rely heavily on spreadsheets for many core or critical tasks, especially for cash forecasting and financial projections.

A cash forecast is a company's estimate of their cash position at a future point in time, which can be derived by the sum of its current cash position plus estimates of its future cash inflows and outflows. Conventional platforms or processes for creating a cash forecast typically derives the forecast from various data sources that may be compiled by the company's finance staff. Traditionally, a financial analyst compiles the data from discussions with employees from other departments (i.e., sales, human resources, engineering, operations, customer service, etc.) within the company, along with data from its internal business and accounting systems. Once all the data is gathered, it is manually inputted or imported into spreadsheets (i.e., Microsoft Excel® or Google Sheets®, or the like), often within a financial model that is manually created, configured and maintained. A considerable amount of effort and analysis is required and expended in computing the forecast using a spreadsheet, because of its natural reliance on human input and control. Once the cash forecast is determined, it is then output to certain reports and communicated to managers for review and decision making.

A primary function of finance & treasury operations for any company is to manage its working capital. This involves managing cash inflows, such as cash collected from its customers for products or services provided, and managing cash outflows, such as payments to vendors. In the daily management of these activities, it is common for a company's cash inflows to be different from its cash outflows due to a variety of factors, including timing differences. The finance & treasury function seeks to maintain adequate liquidity, or cash on hand, to meet any payment obligations and avoid insolvency. When more cash is needed, a company may turn to lenders to either obtain a loan or obtain or increase a line of credit.

Typically, companies compute their financial statements on a monthly or quarterly basis. This is done after the company "closes its books" this means that the company believes that it has recorded all transactions (debits and credits) across all of its accounts which could be a number of financial institutions for a given time period. The term "financial statement" refers to formal records of the financial activities and position of a business, person, or other entity. Relevant financial information is presented in a structured manner and in a form, which is easy to understand. They typically include four basic financial statements accompanied by a management discussion and analysis:

1. A balance sheet or statement of financial position reports on a company's assets, liabilities, and owners' equity at a given point in time.
2. An income statement—or profit and loss report (P&L report), or statement of comprehensive income, or statement of revenue & expense—reports on a company's income, expenses, and profits over a stated period of time. A profit and loss statement provides information on the operation of the enterprise. These include sales and the various expenses incurred during the stated period.
3. A statement of changes in equity or equity statement, or statement of retained earnings, reports on the changes in equity of the company over a stated period of time.
4. A cash flow statement reports on a company's cash flow activities, particularly its operating, investing and financing activities over a stated period of time. (Search "financial statement." on Wikipedia. Oct. 15, 2019.

Accessed Oct. 15, 2019.) In some instances, a cash flow statement indicates the inflow and outflow of cash for the company corresponding to completed transactions, for example revenue generating projects and operational expenses, and may indicate the expected liquidity of the company at a future point in time. "Cash flow" refers to all the revenues and expenses that a company, or part of a company, undertakes during a given time period. (Search "cash flow" on mbaskool.com. Sep. 19, 2019. Accessed Oct. 21, 2019

Currently, there are no known cash management modules that permit a company to see its current cash position in real time, or within the last 48-36 hours, and utilize this cash position to generate a cash forecast. Therefore, a need exists for providing a current, timely, cash forecast from recent company transactions.

BRIEF SUMMARY

A cash forecasting system may include a cash management module and a cash forecast module. The cash management module determines a cash position for a company based on at least financial transactions and ERP system financial data. The cash forecast module generates a cash forecast based on the cash position and one or more cash streams, each cash flow stream configured to represent a cash flow for one aspect of the company and each cash flow stream comprising one or more factors, each factor configured to affect an associated cash flow stream in the future.

A serverless cloud computing platform for generating on-demand company cash forecasts from current financial transaction may include a cash management module and a cash forecast module. The cash management module determines a cash position for a company based on at least financial transactions and ERP system financial data. The cash forecast module generates a cash forecast based on the cash position and one or more cash streams, each cash flow stream configured to represent a cash flow for one aspect of the company and each cash flow stream comprising one or more factors, each factor configured to affect an associated cash flow stream in the future. "On-demand company cash forecasts" refers to a cash forecast that is generated in response to a user request.

In one embodiment, financial transactions are recorded and tracked by a financial institution in financial accounts, such as bank accounts. The financial accounts track a current amount of cash owned by a company and being managed by the financial institution. Financial data representing the amount of cash in a company owned financial account may reflect the real time or near real time account balances for the financial accounts. In certain embodiments, financial data representing financial transactions may be current in the financial accounts and made available to a cash management module within 24-72 hours of completion of the financial transaction. Such financial data representing financial transactions that represents financial transactions completed within a prior 24-72 hour period are referred to herein as settled transactions or settled financial transactions. In certain embodiments, a cash management module determines a cash position based on settled financial transactions.

In some embodiments, the cash management module may include a communications module, a controller, and an output module. The communication module may access financial data over a network by way of an application programming interface from a one or more of a financial institution for each cash account of the company, an enterprise resource planning (ERP) system, and user-generated content.

"Enterprise resource planning (ERP) system" refers to an ERP system. "Communication module" refers to any hardware, software, firmware, circuit, electronic component, module, logic, device, or apparatus configured, programmed, designed, arranged, or engineered to manage, direct, and/or control analog or digital communications between two electronic components. A communication module may use a variety of signal transfer media including wired and wireless interconnects (such as Bluetooth, Radio Frequency (RF), or Wi-fi technology (e.g. radio or chip)).

The controller may determine the cash position for the company. The output module may be utilized to provide the cash position to a user. In general, ERP systems provide access to data that support the business processes in real-time, or near real time. ERP systems and the data they manage may support a variety of business functions or departments, including but not limited to, manufacturing, purchasing, sales, accounting, human resources, supply chain management, project management, customer relationship management, and the like. ERP systems that support accounting manage financial data relating to the general ledger, fixed assets, accounts payable, accounts receivable, cash management, and the like. Examples of ERP systems, ERP system vendors, and/or components that are part of an ERP system, include, but are not limited to, Netsuite®, Salesforce.com®, Workday, SAP, Oracle, Microsoft Dynamics, and the like. In one embodiment, the ERP system includes user-generated content, including, but not limited to one or more cash forecasts.

In another embodiment, the cash management module 500 may accept user-generated content 508 directly from one or more users. User-generated content may also include a plurality of cash forecasts each built based on a different set of assumptions about how the business will operate in the future.

In one embodiment, one or more ERP system may be used to generate or define or modify certain user-generated content for use with embodiments claimed herein. In another embodiment, other tools, such as software applications, may be used to generate or define or modify user-generated content for use with embodiments claimed herein. Certain embodiments, as claimed herein, may obtain user-generated content by way of one or more ERP system. Other embodiments, as claimed herein, a creditor may determine credit worthiness data based on user-generated content and/or one or more ERP systems, either independently or collectively.

In some configurations, the system may include a forecast model, a transaction analyzer, and a predictor. The forecast model may include one or more cash streams, each cash flow stream comprising one or more factors. The transaction analyzer may determine a relationship between historical financial transactions and one or more cash streams of the forecast model. The predictor may project a future cash flow for each of the one or more cash streams based on the relationship.

In some configurations, a cash forecast may include at least one of a start date, an end date, an update frequency, and at least one cash flow stream. The cash flow stream may include at least one of a cash flow stream type and at least one factor. In certain embodiments, the cash flow stream may include at least one tag.

"Factor" refers to a characteristic or attribute relating to a cash flow stream. In certain embodiments, a factor may include one or more of an event, at least one associated cash flow stream, a change, a frequency, a begin date, and an end date. In certain embodiments, the factor may include a percentage change factor configured to change a cash flow stream cash position by a certain percentage with a certain frequency. In certain embodiments, the factor may include a time shift factor configured to change a cash flow stream cash position by an amount based on changing when a financial transaction is to be completed.

In some configurations, the system may include a simulator. The simulator may combine a plurality of cash forecasts into a simulation and generate a company cash forecast based on the plurality of cash forecasts.

A method of operating a cash forecast system may involve determining a cash position for a company. The method may project a company cash forecast for a future time period based on the cash position and historical financial transactions. The method may modify the company cash forecast based on a simulation comprising a plurality of cash forecasts, each cash forecast comprising at least one cash flow stream having a factor. The method may generate a cash flow statement based on a cash position for the company within the last forty-eight hours.

In some configurations, the process of projecting the company cash forecast may involve gathering historical financial transactions from financial institutions, and ERP system financial data from ERP systems. The process may modify the cash position for the company on the basis that the future cash flows are directly correlated with past cash flows that generated the cash position. In certain configurations, the cash flow stream may include a cash uses stream.

An apparatus for operating cash forecasting system may include a processor and a volatile memory media. The volatile memory media may store instructions that, when executed by the processor, cause the processor to perform certain operations.

The instructions may cause the processor to retrieve historical financial transaction from a prior day over a network by way of an application programming interface from a one or more of a financial institution for each cash account of the company, an enterprise resource planning (ERP) system, user-generated content. The instructions may cause the processor to determine a relationship between historical financial transactions and a cash flow stream for a specific part of a company defined by a forecast model, the forecast model comprising one or more cash streams, each cash flow stream comprising one or more factors. The instructions may cause the processor to predict one or more future cash flows for the one or more cash streams defined by the forecast model by applying the relationship. The instructions may cause the processor to generate a cash forecast for a predefined future time period based on a direct method of financial cash flow process using the one or more future cash flows. The instructions may cause the processor to present the direct method generated cash forecast.

In some configurations, the cash forecast may include at least one of a start date, an end date, an update frequency, and at least one cash flow stream.

In some configurations, the factor may include an event, at least one associated cash flow stream, a change, a frequency, a begin date, and an end date.

In some configurations, the at least one of the cash streams may include a combination of cash source financial transactions and cash use financial transactions. "Cash source financial transaction" refers to a set of financial transaction that represent exclusively transactions that supply cash, that result in a credit to a financial account of the company, or a part of the company. "Cash use financial transaction" refers to a set of financial transaction that represent exclusively transactions that use cash, that result in a debit to a financial account of the company, or a part of the company.

In some configurations, a user may enter assumptions for the cash forecast by configuring the one or more cash streams for a specific part of a company.

In some configurations, the apparatus may display a revised direct method generated cash forecast in response to a daily change in one or more of historical financial transactions, ERP system financial data, and user-generated content.

In certain configurations, the cash forecasting system may be operated in connection with a cash management module by a single software-as-a-service ("SaaS") provider automating the process of transferring money between the cash forecasting system and its subscribers/clients.

In certain configurations, the cash forecasting system may (i) be hosted in the cloud by a cloud provider such as Amazon Web Services, Microsoft Azure, or other cloud or infrastructure-as-a-service provider (e.g., a serverless cloud computing platform); (ii) use distributed ledger technology, such as blockchain; (iii) use web or mobile user interfaces; (iv) use artificial intelligence technologies or systems, including machine learning modules, components, or systems; or (v) use banking systems of a financial institutions partner.

In certain configurations, any instructions that the cash forecasting system acts upon may be either from a human or a machine.

In certain configurations, the instructions may make use of any targeted balances, thresholds, limits, amounts, indicators, defined by any of the parties as described in the paragraph above, either by a human or machine using machine learning techniques.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a software system, it should be readily understood that such features are not intended to be limiting. The claims that follow this disclosure are intended to define the scope of the protected subject matter.

This document describes a system and method for autonomous and semi-autonomous cash forecasting and projecting financial results for an enterprise. The system and method may be implemented on a computer-based software and hardware platform that includes one or more computer processors. The software and hardware platform may be scalable both to incorporate a large number of enterprises and to varying degrees or amounts of financial complexity. The financial operating platform described herein may be designed to automate all or much of the labor-intensive processes of conventional accounting, FP&A, and treasure functions, and results in considerable gains in efficiency for the enterprise.

In certain configurations, a computing system, computer-implemented method and computer program product execute a process for autonomous and semi-autonomous cash forecasting and projecting financial results for an enterprise.

The process further includes steps to aggregate the financial data in a cloud-based server platform, and to process, using filtering, querying, correlating, linking, calculating, and/or analyzing according to one or more algorithms, the financial data in the cloud-based server platform to automatically generate one or more financial reports, the one or more financial reports including cash positions, a cash flow forecast, and/or a treasury management report.

The process further includes a step to deliver, from the cloud-based server platform to a client computing device, the one or more financial reports based on a selection received from a user of the client computing device.

Implementations of the current subject matter may include, but are not limited to, systems and methods, as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein.

Computer implemented methods consistent with one or more implementations of the current subject matter may be implemented by one or more data processors residing in a single computing system or multiple computing systems. Such multiple computing systems may be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
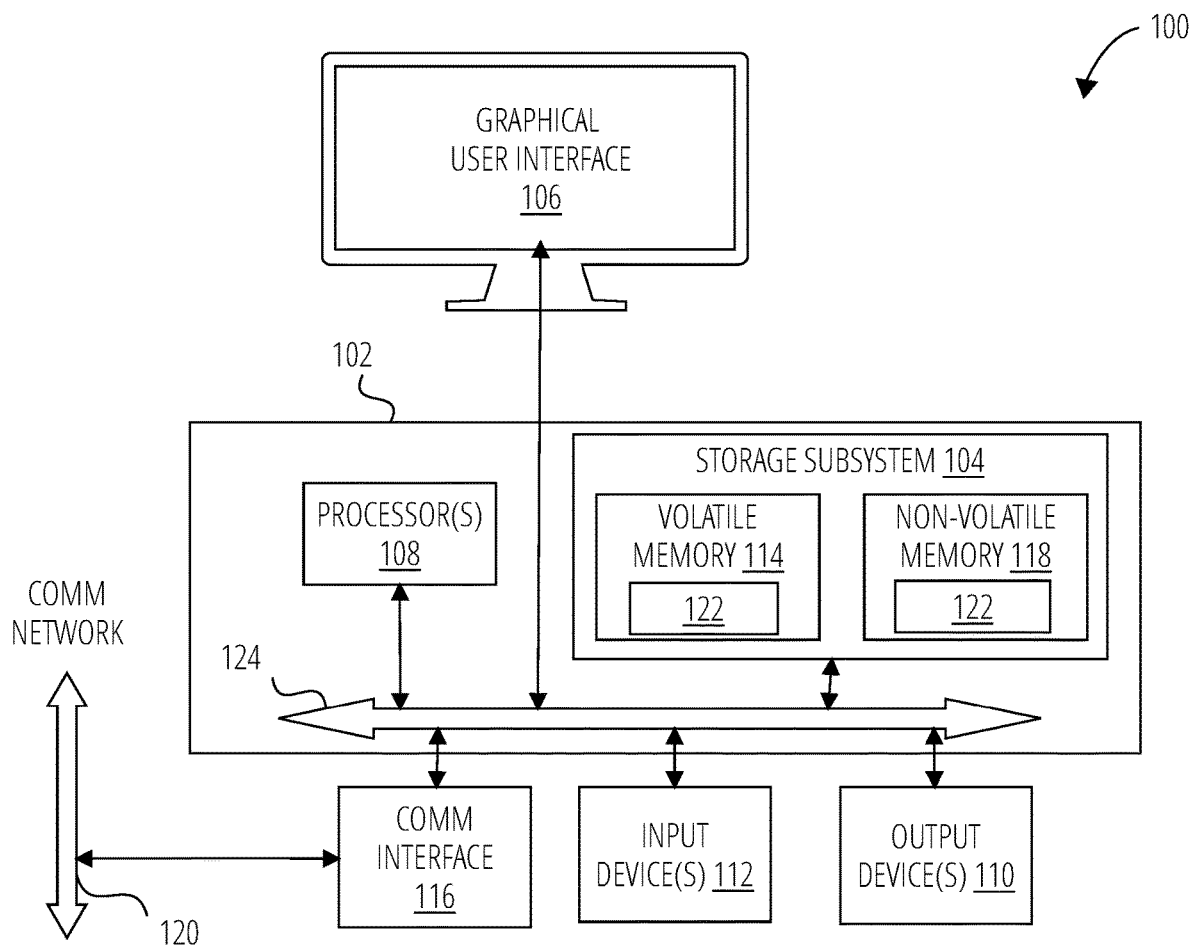
FIG. 1 is an example block diagram of a computing device 100 that may incorporate certain embodiments of this solution.

One problem with traditional cash forecasting is that by the time the forecast is generated, financial information utilized to generate the forecast is out of date which may result in inaccurate predictions or forecasts. A company and its cash position is dynamic and constantly changing. This is because the company continues to operate, and cash transactions happen daily. The challenge faced by traditional cash forecasting is that it takes too long to gather the needed information to produce a reliable and concrete cash forecast. This is because the foundation of a cash forecast, the cash position is dynamic and constantly changing. The steps of identifying the relevant transactions to produce a cash forecast, accurately account for and designate each transaction into an appropriate category and class and subsequently may take days or weeks and a team of financial analysts, accountants, and experts.

However, a recent change in the application programming interfaces (these changes are referred to an "opening" of these interfaces) to computer systems of commercial banks has opened the door for a practical solution to the problem of generating a timely cash forecast. These changes to the application programming interface permit much faster access to the transactions needed to generate a current cash position. In the claimed solutions, an apparatus, machine instructions on a non-transitory computer-readable storage medium, or computing apparatus, such as serverless cloud computing platform, leverages the open application programming interfaces to gather the most recent transactions, on demand and in real-time. This real time access provides a practical solution to the problem of days or weeks of delays in gathering financial transaction information. The claimed solutions, an apparatus, machine instructions on a non-transitory computer-readable storage medium, or computing apparatus, such as serverless cloud computing platform, provide a practical and accurate way to gather the information needed for determining a cash position that saves a company important resources such as employee time and expense, and provides cash position information faster so that company leaders can make changes to the operating plan for the company as needed. These claimed solutions enable the business leaders to be proactive in their decisions rather than reactive.

As will be discussed further herein, generating a cash forecast involves a number of assumptions, criteria, and parameters. Generating a cash forecast also requires certain data values unique to a company, assumptions, and time series events, or potential events, that a company may need factored into a cash forecast. The number and complexity of these variables is unique to each company and important to the credibility and reliability of a cash forecast that results.

The claimed solutions, provide a solution that simplifies these variables and enables a user to quickly assemble the needed information, generate a cash forecast and assess whether the generated cash forecast is reliable, accurate, timely, and trustworthy. The claimed solutions, an apparatus, machine instructions on a non-transitory computer-readable storage medium, or computing apparatus, such as serverless cloud computing platform, provide a practical tools to provide this simplification such as, but not limited to, factors that capture assumptions and variables, organized collections of financial transactions, such as, for example, cash flow streams, among other components and modules described herein. Furthermore, the claimed solutions enable a user and/or business leader to readily adjust these assumptions and/or variables and quickly generate a revised cash forecast.

A system and method for autonomous and semi-autonomous cash forecasting and projecting financial results may be implemented as a computer-based software and/or hardware platform that includes one or more computer processors. "Software" refers to logic implemented as instructions for controlling a programmable device or component of a device (e.g., a programmable processor, controller). Software can be source code, object code, executable code, machine language code. Unless otherwise indicated by context, software shall be understood to mean the embodiment of said code in a machine memory or hardware component, including "firmware" and micro-code. "Executable code" refers to Instructions in a ready-to-execute form by a programmable device. For example, source code instructions in non-interpreted execution environments are not executable code because they must usually first undergo compilation, linking, and loading by the operating system before they have the proper form for execution. Interpreted computer code may be considered executable code because it can be directly applied to a programmable device (an interpreter) for execution, even though the interpreter itself may further transform the interpreted computer code into machine language instructions.

In one aspect, a computer-based financial operating platform may be provided to seamlessly automate many of the operational tasks across all financial functional areas within the enterprise, which include accounting, FP&A, and treasury. The platform functions as a financial data aggregation hub, having a machine-readable medium storing non-transitory instructions that enables one or more computer processors to execute software algorithms to make intelligent associations between data elements to compute, analyze, and predict financial results. "Instructions" refers to symbols representing commands for execution by a device using a processor, microprocessor, controller, interpreter, or other programmable logic. Broadly, 'instructions' can mean source code, object code, and executable code. 'instructions' herein is also meant to include commands embodied in programmable read-only memories (EPROM) or hard coded into hardware (e.g., 'micro-code') and like implementations wherein the instructions are configured into a machine memory or other hardware component at manufacturing time of a device. The term "algorithm" refers to any set of instructions configured to cause a machine to carry out a particular function or process. The systems and methods described herein generate efficiencies, improve accuracy, add precision, and enable real-time visibility of current and future financial positions and performance.

In one aspect, the financial operating platform (1) acquires and aggregates proprietary and non-proprietary financial data from external and internal sources, including but not limited to financial institutions, business systems or spreadsheets (i.e., Salesforce.com, Workday, Excel, etc.), accounting systems (i.e., Netsuite, SAP, etc.), market data (i.e., foreign exchange rates, interest rates, world news & events, etc.), and user-generated content; (2) securely stores, manages, monitors, the data; (3) compiles, processes, connects, computes, and enriches the data; and (4) autonomously and/or semi-autonomously forecasts and projects cash, financial positions, and financial performance data and metrics. The financial operating platform, through all of these functions, serves companies by streamlining or automating many financial computations that are currently performed manually or with the use of spreadsheets.

In another aspect, by acquiring and aggregating all such data from the various sources as described above, most of which come from disparate or "siloed" systems, the financial operating platform may provide historical cash and financial positions that are significantly more meaningful and that may be significantly enhanced because the data collectively makes for a more complete picture for end users, and as a result, new conclusions may be derived and more in-depth analytics may be executed when the data is brought together.

By connecting to various data sources using application programing interfaces (APIs), the financial operating platform may retrieve the many required data elements to compute the cash forecast autonomously. For example, by connecting with Salesforce.com®, the financial operating platform may retrieve a company's sales estimates as projected and planned by a company's sales team. That sales data may then be used to determine a company's future revenue based on historical performance and other criteria. Once revenue is determined, this inherently determines what a company's Accounts Receivable (AR) balances may be at certain points in time. Furthermore, once a company's AR balances are determined, and using a company's actual collections history by its customers, cash receipts at certain future dates may then be determined. Therefore, by connecting to the various business and accounting systems of a company, all or much of the data may be retrieved and subsequently used to calculate the cash forecast in an autonomous or semi-autonomous fashion. Similarly, by connecting into an enterprise resource planning (ERP) system such as Netsuite®, the financial operating platform may retrieve the AR and Accounts Payable (AP) balances that may convert to cash based on a customer's payment terms and its actual payment history, as well as the company's own payment policies with vendors, respectively.

This document describes a system and method for autonomous and semi-autonomous cash forecasting and projecting financial results. The system and method may be implemented as a computer-based software and hardware platform that includes one or more computer processors. The term "hardware" refers to logic embodied as analog and/or digital circuitry.

"Circuitry" refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

In one aspect, the financial operating platform (1) acquires and aggregates proprietary and non-proprietary financial data from external and internal sources, including but not limited to financial institutions, business systems or spreadsheets (i.e., Salesforce.com, Workday, Excel, etc.), accounting systems (i.e., Netsuite, SAP, etc.), market data (i.e., foreign exchange rates, interest rates, world news & events, etc.), and user-generated content; (2) securely stores, manages, monitors, the data; (3) compiles, processes, connects, computes, and enriches the data; and (4) autonomously and/or semi-autonomously forecasts and projects cash, financial positions, and financial performance data and metrics. The financial operating platform, through all of these functions, serves companies by streamlining or automating many financial computations that are currently performed manually or with the use of spreadsheets.

In some implementations, the platform includes the following distinct functional modules: (1) data acquisition; (2) data processing; and (3) financial applications.

(1) Data Acquisition and Aggregation

The platform acquires data from at least the following five primary sources: (a) financial institutions; (b) enterprise Resource Planning (ERP) and other business systems or applications that the enterprise depends on to operate; (c) external market data, such as foreign exchange rates or interest rates that may be acquired from third-party aggregators; (d) user-generated content, such as cash forecasting assumptions determined by a company's finance staff; and (e) external global market news and events that could affect a company's assets or financial performance. The platform may be connected with each of these data sources via one or more computer communication networks, and via any number of interfaces such as application programming interfaces (APIs). These connections may be configured to enable the platform to automatically "pull" in the relevant data from each of the data sources, or have the data sources automatically "push" the relevant data to the platform, or both. The relevant data may be determined and set by a user, or the platform may utilize machine learning algorithms to intelligently "learn" which data may be relevant for the platform's functionality.

The platform may not be tied to the data sources listed above; it takes advantage of a flexibly configured ingestion layer that may pull data from any number or type of yet to be known systems, or receive push communications with standardized data across numerous possible communication channels to create new or enriched data sets within the data lake.

The platform aggregates data from these sources into its cloud-native platform, i.e., one or more server computers that are accessible by one or more client computers via a computer network, and securely stores, monitors, manages, and protects this data in the cloud on behalf of its customers.

The platform architecture consists of a data lake that stores the data, in whichever format the source data provides it, or a sensible amalgamation (for example, raw database data may be stored in CSV or JSON format). The storage format may be structured, unstructured or semi-structured data. The data lake may include a database formed in a computer storage or memory subsystem. The data lake maintains an ever-growing historical view of original financial data for any company. This corpus of data allows the further components of the platform or system to be continuously enhanced without necessarily requiring new data to be input.

(2) Data Processing

The platform may enrich the raw data it aggregates through a process of filtering, querying, correlating, linking, calculating, and analyzing, using algorithms it either generates or was generated directly or indirectly through machine learning methods. The platform's enriched data may allow it to automate many common workflows that are currently performed either manually or semi-manually via spreadsheets within most business's conventional finance, accounting, and treasury functions. The platform's data processing drives workflow automation in many different areas of finance, accounting, and treasury operations.

Making associations between the many different types of data from the many different sources and processing the raw data to produce enriched data, allows the platform to provide insights to a business's health and financial operating performance. Furthermore, it becomes a powerful tool for the enterprise to report on, manage and forecast cash, along with managing treasury functions like minimizing foreign currency exposure, optimizing yield on investments, and other risk management activities.

The platform architecture includes one or more databases that are derived from ingested data in the data lake using query methods and analytical tools such as full-text search engines and distributed in-memory frameworks, in conjunction with the various algorithms and methods to determine certain outputs that become the content used by its many applications for the platform's end user customers. These applications are designed to compute or solve business and financial problems, create or improve workflows and efficiencies, replace, improve, or augment spreadsheet work or processes, and report data in meaningful ways that provide significant leverage or automation across the finance, accounting, and treasury departments.

The prescriptive application of advanced statistical modeling tools may also be computed over the entire corpus of the financial data set for a customer or many customers, both on-demand and in real-time. This allows, for instance, machine learning to be active as data flows through the system and may provide scoring, classification, prediction and other derived metrics to other processing components as they work, rather than using an after the fact method as many competitive systems may eventually have to.

(3) Financial Applications

The platform uses enriched data it has collected to deliver efficiencies to businesses through a variety of applications including, but not limited to the following: connectivity to financial institutions, connectivity to SWIFT, financial connectivity performance monitoring, data access for Business Intelligence (BI) software, financial reporting, data conversion, data translation, cash positions, general ledger transactions, transaction matching, cash reconciliation, cash forecasting, cybersecurity, specialized reporting, systems integration, data analytics, bi-directional Excel interface, payments, merchant settlement, Foreign Exchange (FX) exposure capture and trading, compliance, intercompany netting, in-house bank, bank fee analysis, entity management, debt management, interest rate exposure and trading, investment management, trade services, derivatives processing, hedge accounting, commodities exposure capture and trading, and risk management.

Figure 2:
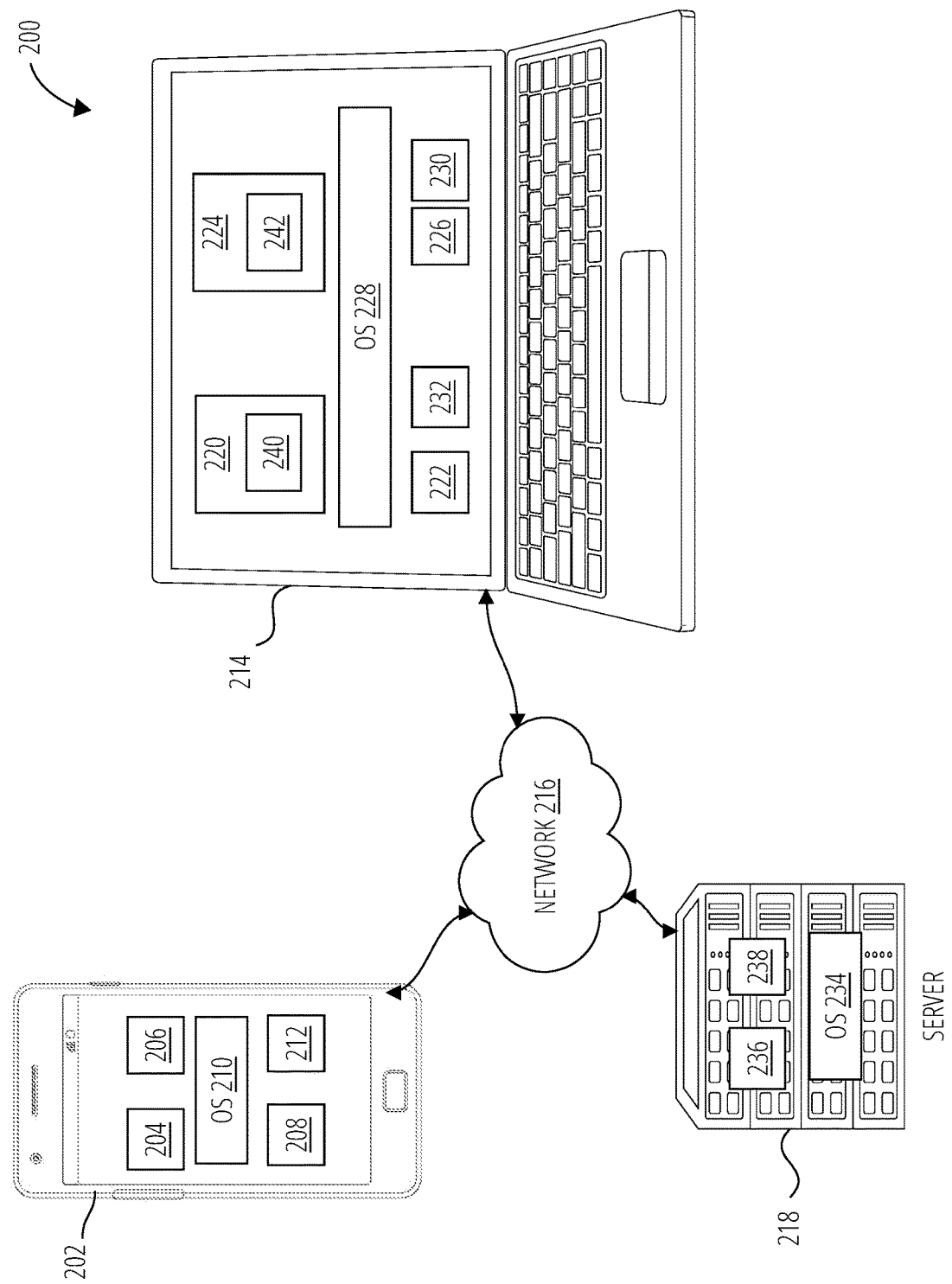
FIG. 2 illustrates a client server network configuration 200 in accordance with one embodiment.

As part of its functionality, the platform may deliver data and enriched data, as depicted in FIG. 2, through many channels of distribution, including, but not limited to:
1. Web application
2. Mobile application
3. External managed BI tool
4. Internally hosted (built-in) BI tool 5. Externally managed spreadsheet
6. Internally hosted (built-in) spreadsheet
7. REST API access The platform gathers data from multiple sources, enriches that data by making associations amongst the data when aggregated or by its own computations from what it recognizes or processes, and then distributes results through a variety of applications. The system distributes results through a variety of applications that become the basis for reporting financial items, results, or performance in a more efficient manner, and becomes an intelligent hub of information for platform-proprietary applications, third-party applications or third-party developers, and for making more informed business decisions.

In some implementations, the system uses the enriched data to predict or forecast (i) future cash flows; (ii) future cash positions; (iii) financial performance; (iv) financial or business metrics; (v) financial or business results; and (vi) events. The system uses the enriched data to distribute or report real-time financial results, performance, metrics, KPIs, and other data. The system uses the enriched data to provide treasury management system features and functionality like cash positions, account reconciliations, general ledger transactions, transaction matching, cash reconciliations, cash forecasting, cybersecurity, specialized reporting, payments, merchant settlement, Foreign Exchange (FX) exposure capture and trading, compliance, intercompany netting, in-house bank, bank fee analysis, entity management, bank account management, debt management, interest rate exposure and trading, investment management, trade services, derivatives processing, hedge accounting, commodities exposure capture and trading, and risk management.

The platform's methods of distributions include web applications, mobile applications, through business intelligence applications, to business intelligent applications, through spreadsheets, to spreadsheets, to other media and other third-party systems using APIs or other methods.

The platform seeks to change, augment, or improve, the current global cycles for financial reporting and analysis, which may generally be performed monthly, quarterly, and annually, by automating the methods of compiling and predicting the financial results of a company's performance through data aggregation using machine learning, quantitative analysis, and other machine-based statistical and derived methods.

The platform combines data from financial institutions, business and accounting (ERP or other) systems, and external market data to derive a company's future outcome of financial performance, and further combines internally derived assumptions to derive a company's future outcome of financial performance.

The platform provides for enhanced cybersecurity. Using modern mobile platforms and the enriched data sets available in its data lake, the platform may drive a greatly enhanced standard for security between financial systems and within the financial sector in general: Mobile devices may be used to drive new methods of authenticating financial actions such as payments and transfers as well as drive verification of other actions toward a more-real time level of auditing and awareness. The vast trove of data available to the platform may be actively mined and profiled to produce a more integrated approach to fraud detection and security analysis that other siloed systems do not have available. In addition, the platform's data acquisition process captures not only data at rest, but may also integrate into the data lake behavioral data of information flowing through it which provides a much more latent capacity for security analysis.

Automated Cash Forecast

The platform may execute a traditional cash forecast to understand a company's financial health, performance, and for management to make informed decisions to meet strategic or operating objectives. "Cash forecast" refers to a projection of a cash position of a company at a specific future time, or over a specific future period of time. The platform displaces the enterprise's current process, which may typically be done manually using spreadsheets to calculate such results. The platform automates the cash forecast by leveraging its data aggregation and data processing methods to calculate and derive current and future cash flows. Such methods use historical financial data and derived data using algorithms that predict future cash flows and cash positions analyzing trends from, but not limited to, sales, expenses, receivables, payables, proceeds, payments, inventory, and depreciation and other non-cash items. This generates considerable time savings while producing more accurate results in a timelier manner.

Predictive Analytics

The platform may leverage its 'big data' platform to calculate and derive Key Performance Indicators (KPIs) and other statistics to report and score a company's operating performance. For instance, using accounts receivable and accounts payable data from a company's accounting or ERP system coupled with historical cash transactions, the platform may derive a company's working capital ratios, such as Days Receivable Outstanding (DRO) and Days Payable Outstanding (DPO). "ERP system" refers to one or more systems comprising hardware, software, interfaces, databases, either alone or in combination, that collect, track, and report on business process information for a company, or part of a company. In general, ERP systems provide access to data that support the business processes in real-time, or near real time. ERP systems and the data they manage may support a variety of business functions or departments, including but not limited to, manufacturing, purchasing, sales, accounting, human resources, supply chain management, project management, customer relationship management, and the like. ERP systems that support accounting manage financial data relating to the general ledger, fixed assets, accounts payable, accounts receivable, cash management, and the like. Examples of ERP systems, ERP system vendors, and/or components that are part of an ERP system, include, but are not limited to, Netsuite®, Salesforce.com®, Workday, SAP, Oracle, Microsoft Dynamics, and the like.

Predictive Financials

The platform may leverage its "big data" configuration to calculate and derive financial operating performance from data processing methods using data from multiple sources and various types of data, such as a company's historical bank balances and transactions, cash flow types, accounting system data, and world events, and data from key customers.

Predictive financial metrics using platform insights—Using data from all its customers across its entire platform at scale and anonymously, the platform may generate more accurate financial performance metrics and improve the accuracy of its forecasting capabilities at a detailed level for the benefit of individual companies.

Quote-to-Cash Metrics

The platform may autonomously or semi-autonomously compute the number of days it takes for a sale to be quoted to a customer and then later be fully collected after it converts to an accounts receivable. With the platform integrated with the various data sources from its business systems, ERP system, and bank, a digital timeline may be recorded, analyzed, computed, and reported in real time or near real time. The measurement may be used as a highly effective metric for measuring a company's operational performance.

Automated Reporting

The platform brings a company's data together from many sources and significantly improves the efficiency of financial reporting, planning, and analysis using multiple reporting mediums.

Financial data tagging—the platform tags data as part of its data enrichment process. These tags enhance the meaning of transactions with description identifiers using words, phrases or iconography. The platform allows users to add tags via its interface, which may be captured as part of user-generated content.

User Tagging with Comments

Users, via the platform's user interface (UI) may input comments as tags that temporarily or permanently stay connected to data within the platform's integrated systems, such as comments for variances analysis. For example, if a change in cash position goes up by 30% month over month, the user may add a comment that explains such variance. Such comment(s) may be stored and connected to the financial data to which it applies, and may be accessible for future use and analysis, such as with historical analysis of similar data.

User Tagging "N Words or Less"

In providing users with the ability to add tags or comments to variances or other financial data that adds descriptive information helpful to other users, the platform may capture a specific limited number of words tag that becomes the standard descriptive tagging element for user engagement. In some implementations, the number of words may be five, but more or fewer words may also be used.

Financial Operating Platform

The platform creates efficiencies across Accounting, Finance, and Treasury departments by aggregating information from banks, internal systems, and external market data and then uses that information to perform and complete many jobs, duties, and tasks that are currently performed manually by people or in connection with spreadsheets. The platform displaces manual and spreadsheet work to save time and money, and also enables insight and visibility to future financial positions and performance in real- or near real-time giving executive management, such as the CFO, access to information much more quickly than may be currently generated.

One or more aspects or features of the subject matter described herein may be realized in digital electronic circuitry, integrated circuitry, specially designed application specific integrated circuits (ASICs), field programmable gate arrays (FPGAs) computer hardware, firmware, software, and/or combinations thereof. The term "firmware" refers to software logic embodied as processor-executable instructions stored on volatile memory media and/or non-volatile memory media. The term "volatile memory media" refers to any hardware, device, component, element, or circuit configured to maintain an alterable physical characteristic used to represent a binary value of zero or one for which the alterable physical characteristic reverts to a default state that no longer represents the binary value when a primary power source is removed or unless a primary power source is used to refresh the represented binary value. Examples of volatile memory media include but are not limited to dynamic random-access memory (DRAM), static random-access memory (SRAM), double data rate random-access memory (DDR RAM) or other random-access solid-state memory. "Characteristic" refers to any property, trait, quality, or attribute of an object or thing. Examples of characteristics include, but are not limited to, condition, magnitude, degree, direction, speed, rate of change, readiness for use, unreadiness for use, size, weight, composition, feature set, and the like.

While the volatile memory media is referred to herein as "memory media," in various embodiments, the volatile memory media may more generally be referred to as volatile memory.

In certain embodiments, data stored in volatile memory media is addressable at a byte level which means that the data in the volatile memory media is organized into bytes (8 bits) of data that each have a unique address, such as a logical address. The term "non-volatile memory media" refers to any hardware, device, component, element, or circuit configured to maintain an alterable physical characteristic used to represent a binary value of zero or one after a primary power source is removed. These various aspects or features may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. The term "executable" refers to a file comprising executable code. If the executable code is not interpreted computer code, a loader is typically used to load the executable for execution by a programmable device. The term "programmable device" refers to any logic (including hardware and software logic) who's operational behavior is configurable with instructions. The term "loader" refers to logic for loading programs and libraries. The loader is typically implemented by the operating system. A typical loader copies an executable into memory and prepares it for execution by performing certain transformations, such as on memory addresses. The term "interpreted computer code" refer to Instructions in a form suitable for execution by an interpreter. Interpreted computer code may be considered executable code because it can be directly applied to a programmable device (an interpreter) for execution, even though the interpreter itself may further transform the interpreted computer code into machine language instructions. The term "interpreter" refers to logic that directly executes instructions written in a source code scripting language, without requiring the instructions to a priori be compiled into machine language. "Source code" refers to a high-level textual computer language that requires either interpretation or compilation in order to be executed by a device. An interpreter translates the instructions into another form, for example into machine language, or into calls to internal functions and/or calls to functions in other software modules. "Module" refers to a computer code section having defined entry and exit points. Examples of modules are any software comprising an application programming interface, drivers, libraries, functions, and subroutines. The term "file" refers to a unitary package for storing, retrieving, and communicating data and/or instructions. A file is distinguished from other types of packaging by having associated management metadata utilized by the operating system to identify, characterize, and access the file.

The programmable system or computing system may include clients and servers. A client and server are generally remote from each other and typically interact through a communication network. The relationship of client and server arises by virtue of computer programs running on the respective computers and having a client-server relationship to each other. "Computer program" refers to another term for 'application' or 'app'.

The term "circuitry" refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random-access memory), or circuitry forming a communications device (e.g., a modem, communications switch, or optical-electrical equipment). The term "computer" refers to any computing device. Examples of a computer include, but are not limited to, a personal computer, a laptop, a tablet, a desktop, a server, a main frame, a super computer, a computing node, a virtual computer, a hand held device, a smart phone, a cell phone, a system on a chip, a single chip computer, and the like.

These computer programs, which may also be referred to as programs, software, software applications, applications, components, or code, include machine instructions for a programmable processor, and may be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random-access memory associated with one or more physical processor cores.

To provide for interaction with a user, one or more aspects or features of the subject matter described herein may be implemented on a computer having a display device, such as for example a cathode ray tube (CRT), a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the implementations described above may be directed to various combinations and sub combinations of the disclosed features and/or combinations and sub combinations of several further features disclosed above. In addition, the logic flows depicted in the accompanying figures and/or described herein do not necessarily require the particular order shown, or sequential order, to achieve desirable results. Other implementations may be within the scope of the following claims.

FIG. 1 is an example block diagram of a computing device 100 that may incorporate embodiments of the claimed solution. FIG. 1 is merely illustrative of a machine system to carry out aspects of the technical processes described herein, and does not limit the scope of the claims. One of ordinary skill in the art would recognize other variations, modifications, and alternatives. In certain embodiments, the computing device 100 includes a graphical user interface 106, a data processing system 102, a communication network 120, communication network interface 116, input device(s) 112, output device(s) 110, and the like.

As depicted in FIG. 1, the data processing system 102 may include one or more processor(s) 108 and a storage subsystem 104. "Processor" refers to any circuitry, component, chip, die, package, or module configured to receive, interpret, decode, and execute machine instructions. Examples of a processor may include, but are not limited to, a central processing unit, a general-purpose processor, an application-specific processor, a graphics processing unit (GPU), a field programmable gate array (FPGA), application Specific Integrated Circuit (ASIC), System on a Chip (SoC), virtual processor, processor core, and the like. The processor(s) 108 communicate with a number of peripheral devices via a bus subsystem 124. These peripheral devices may include input device(s) 112, output device(s) 110, communication network interface 116, and the storage subsystem 104. The storage subsystem 104, In one embodiment, comprises one or more storage devices and/or one or more memory devices. "Memory" refers to any hardware, circuit, component, module, logic, device, or apparatus configured, programmed, designed, arranged, or engineered to retain data. Certain types of memory require availability of a constant power source to store and retain the data. Other types of memory retain and/or store the data when a power source is unavailable. The term "storage device" refers to any hardware, system, sub-system, circuit, component, module, non-volatile memory media, hard disk drive, storage array, device, or apparatus configured, programmed, designed, or engineered to store data for a period of time and retain the data in the storage device while the storage device is not using power from a power supply. Examples of storage devices include, but are not limited to, a hard disk drive, FLASH memory, MRAM memory, a Solid-State storage device, Just a Bunch Of Disks (JBOD), Just a Bunch Of Flash (JBOF), an external hard disk, an internal hard disk, and the like.

In one embodiment, the storage subsystem 104 includes a volatile memory 114 and a non-volatile memory 118. The term "volatile memory" refers to a shorthand name for volatile memory media. In certain embodiments, volatile memory refers to the volatile memory media and the logic, controllers, processor(s), state machine(s), and/or other periphery circuits that manage the volatile memory media and provide access to the volatile memory media. The term "non-volatile memory" refers to shorthand name for non-volatile memory media. In certain embodiments, non-volatile memory media refers to the non-volatile memory media and the logic, controllers, processor(s), state machine(s), and/or other periphery circuits that manage the non-volatile memory media and provide access to the non-volatile memory media. The volatile memory 114 and/or the non-volatile memory 118 may store computer-executable instructions that alone or together form logic 122 that when applied to, and executed by, the processor(s) 108 implement embodiments of the processes disclosed herein. The term "logic" refers to machine memory circuits, non-transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

The input device(s) 112 include devices and mechanisms for inputting information to the data processing system 102. These may include a keyboard, a keypad, a touch screen incorporated into the graphical user interface 106, audio input devices such as voice recognition systems, microphones, and other types of input devices. In various embodiments, the input device(s) 112 may be embodied as a computer mouse, a trackball, a track pad, a joystick, wireless remote, drawing tablet, voice command system, eye tracking system, and the like. The input device(s) 112 typically allow a user to select objects, icons, control areas, text and the like that appear on the graphical user interface 106 via a command such as a click of a button or the like.

The output device(s) 110 include devices and mechanisms for outputting information from the data processing system 102. These may include the graphical user interface 106, speakers, printers, infrared LEDs, and so on, as well understood in the art. In certain embodiments, the graphical user interface 106 is coupled to the bus subsystem 124 directly by way of a wired connection. In other embodiments, the graphical user interface 106 couples to the data processing system 102 by way of the communication network interface 116. For example, the graphical user interface 106 may comprise a command line interface on a separate computing device 100 such as desktop, server, or mobile device. A graphical user interface 106 may comprise one example of, or one component of a user interface. "User interface" refers to a set of logic, components, devices, software, firmware, and peripherals configured to facilitate interactions between humans and machines and/or computing devices.

The communication network interface 116 provides an interface to communication networks (e.g., communication network 120) and devices external to the data processing system 102. The communication network interface 116 may serve as an interface for receiving data from and transmitting data to other systems. Embodiments of the communication network interface 116 may include an Ethernet interface, a modem (telephone, satellite, cable, ISDN), (asynchronous) digital subscriber line (DSL), FireWire, USB, a wireless communication interface such as Bluetooth or WiFi, a near field communication wireless interface, a cellular interface, and the like.

The communication network interface 116 may be coupled to the communication network 120 via an antenna, a cable, or the like. In some embodiments, the communication network interface 116 may be physically integrated on a circuit board of the data processing system 102, or in some cases may be implemented in software or firmware, such as "soft modems", or the like.

The computing device 100 may include logic that enables communications over a network using protocols such as HTTP, TCP/IP, RTP/RTSP, IPX, UDP and the like.

The volatile memory 114 and the non-volatile memory 118 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 114 and the non-volatile memory 118 may be configured to store the basic programming and data constructs that provide the functionality of the disclosed processes and other embodiments thereof that fall within the scope of the present invention.

Logic 122 that implements one or more parts of embodiments of the solution may be stored in the volatile memory 114 and/or the non-volatile memory 118. Logic 122 may be read from the volatile memory 114 and/or non-volatile memory 118 and executed by the processor(s) 108. The volatile memory 114 and the non-volatile memory 118 may also provide a repository for storing data used by the logic 122.

The volatile memory 114 and the non-volatile memory 118 may include a number of memories including a main random-access memory (RAM) for storage of instructions and data during program execution and a read only memory (ROM) in which read-only non-transitory instructions are stored. The volatile memory 114 and the non-volatile memory 118 may include a file storage subsystem providing persistent (non-volatile) storage for program and data files.

The volatile memory 114 and the non-volatile memory 118 may include removable storage systems, such as removable flash memory.

The bus subsystem 124 provides a mechanism for enabling the various components and subsystems of data processing system 102 communicate with each other as intended. Although the communication network interface 116 is depicted schematically as a single bus, some embodiments of the bus subsystem 124 may utilize multiple distinct busses.

It will be readily apparent to one of ordinary skill in the art that the computing device 100 may be a device such as a smartphone, a desktop computer, a laptop computer, a rack-mounted computer system, a computer server, or a tablet computer device. As commonly known in the art, the computing device 100 may be implemented as a collection of multiple networked computing devices. Further, the computing device 100 will typically include operating system logic (not illustrated) the types and nature of which are well known in the art.

Terms used herein should be accorded their ordinary meaning in the relevant arts, or the meaning indicated by their use in context, but if an express definition is provided, that meaning controls.

The apparatuses, systems, and/or methods disclosed herein, or particular components thereof, may in some embodiments be implemented as software comprising instructions executed on one or more programmable device. "Programmable device" refers to any logic (including hardware and software logic) who's operational behavior is configurable with instructions. By way of example, components of the disclosed systems may be implemented as an application, an app, drivers, or services. "Application" refers to any software that is executed on a device above a level of the operating system. An application will typically be loaded by the operating system for execution and will make function calls to the operating system for lower-level services. An application often has a user interface, but this is not always the case. Therefore, the term 'application' includes background processes that execute at a higher level than the operating system. "App" refers to a type of application with limited functionality, most commonly associated with applications executed on mobile devices. Apps tend to have a more limited feature set and simpler user interface than applications as those terms are commonly understood in the art. "Driver" refers to low-level logic, typically software, that controls components of a device. Drivers often control the interface between an operating system or application and input/output components or peripherals of a device, for example. "Service" refers to a process configurable with one or more associated policies for use of the process. Services are commonly invoked on server devices by client devices, usually over a machine communication network such as the Internet. Many instances of a service may execute as different processes, each configured with a different or the same policies, each for a different client.

The term "subroutine" refers to a module configured to perform one or more calculations or other processes. In some contexts, the term 'subroutine' refers to a module that does not return a value to the logic that invokes it, whereas a 'function' returns a value. However herein the term 'subroutine' is used synonymously with 'function'.

The term "task" refers to one or more operations that a process performs. However, the system need not necessarily be accessed over a network and could, in some embodiments, be implemented by one or more app or applications on a single device or distributed between a mobile device and a computer, for example. "Computer" refers to any computing device. Examples of a computer include, but are not limited to, a personal computer, a laptop, a tablet, a desktop, a server, a main frame, a super computer, a computing node, a virtual computer, a hand held device, a smart phone, a cell phone, a system on a chip, a single chip computer, and the like.

The term "plug-in" refers to software that adds features to an existing computer program without rebuilding (e.g., changing or re-compiling) the computer program. Plug-ins are commonly used for example with Internet browser applications.

Referring to FIG. 2, a client server network configuration 200 illustrates various computer hardware devices and software modules coupled by a network 216 in one embodiment. Each device includes a native operating system, typically pre-installed on its non-volatile RAM, and a variety of software applications or apps for performing various functions.

The mobile programmable device 202 comprises a native operating system 210 and various apps (e.g., app 204 and app 206). A computer 214 also includes an operating system 228 that may include one or more libraries of native routines to run executable software on that device. The computer 214 also includes various executable applications (e.g., application 220 and application 224). The mobile programmable device 202 and computer 214 are configured as clients on the network 216. A server 218 is also provided and includes an operating system 234 with native routines specific to providing a service (e.g., service 238 and service 236) available to the networked clients in this configuration.

As is well known in the art, an application, an app, or a service may be created by first writing computer code to form a computer program, which typically comprises one or more computer code sections or modules. Computer code may comprise instructions in many forms, including source code, assembly code, object code, executable code, and machine language. The term "computer code" refers to any of source code, object code, or executable code. The term "assembly code" refers to a low-level source code language comprising a strong correspondence between the source code statements and machine language instructions. Assembly code is converted into executable code by an assembler. The conversion process is referred to as assembly. Assembly language usually has one statement per machine language instruction, but comments and statements that are assembler directives, macros, and symbolic labels may also be supported. Computer programs often implement mathematical functions or algorithms and may implement or utilize one or more application programming interfaces. "Application programming interface" refers to instructions implementing entry points and return values to a module. The term "machine language" refers to Instructions in a form that is directly executable by a programmable device without further translation by a compiler, interpreter, or assembler. In digital devices, machine language instructions are typically sequences of ones and zeros.

A compiler is typically used to transform source code into object code and thereafter a linker combines object code files into an executable application, recognized by those skilled in the art as an "executable". "Compiler" refers to Logic that transforms source code from a high-level programming language into object code or in some cases, into executable code.

The distinct file comprising the executable would then be available for use by the computer 214, mobile programmable device 202, and/or server 218. Any of these devices may employ a loader to place the executable and any associated library in memory for execution. The operating system executes the program by passing control to the loaded program code, creating a task or process. An alternate means of executing an application or app involves the use of an interpreter (e.g., interpreter 242). The term "linker" refers to Logic that inputs one or more object code files generated by a compiler or an assembler and combines them into a single executable, library, or other unified object code output. One implementation of a linker directs its output directly to machine memory as executable code (performing the function of a loader as well). The term "library" refers to a collection of modules organized such that the functionality of all the modules may be included for use by software using references to the library in source code. The term "object code" refers to the computer code output by a compiler or as an intermediate output of an interpreter. "Computer code" refers to any of source code, object code, or executable code. Object code often takes the form of machine language or an intermediate language such as register transfer language (RTL).

In addition to executing applications ("apps") and services, the operating system is also typically employed to execute drivers to perform common tasks such as connecting to third-party hardware devices (e.g., printers, displays, input devices), storing data, interpreting commands, and extending the capabilities of applications. For example, a driver 208 or driver 212 on the mobile programmable device 202 or computer 214 (e.g., driver 222 and driver 232) might enable wireless headphones to be used for audio output(s) and a camera to be used for video inputs. Any of the devices may read and write data from and to files (e.g., file 226 or file 230) and applications or apps may utilize one or more plug-in (e.g., plug-in 240) to extend their capabilities (e.g., to encode or decode video files). The term "operating system" refers to logic, typically software, that supports a device's basic functions, such as scheduling tasks, managing files, executing applications, and interacting with peripheral devices. In normal parlance, an application is said to execute "above" the operating system, meaning that the operating system is necessary in order to load and execute the application and the application relies on modules of the operating system in most cases, not vice-versa. The operating system also typically intermediates between applications and drivers. Drivers are said to execute "below" the operating system because they intermediate between the operating system and hardware components or peripheral devices. The term "plug-in" refers to software that adds features to an existing computer program without rebuilding (e.g., changing or re-compiling) the computer program. Plug-ins are commonly used for example with Internet browser applications.

The network 216 in the client server network configuration 200 can be of a type understood by those skilled in the art, including a Local Area network (LAN), Wide Area network (WAN), Transmission Communication Protocol/Internet Protocol (TCP/IP) network, and so forth. These protocols used by the network 216 dictate the mechanisms by which data is exchanged between devices.

As subsequent figures are described, certain terminology is used. Explanation for some of that terminology is included here.

"Disparate computer server systems" refers to physically distinct and separate computer systems operated by distinct and separate companies and accessible over distinct and separate communication channels from one another. "Process" refers to software that is in the process of being executed on a device. "Ingest module" refers to logic that opens and operates one or more communication sessions to pull data from disparate computer server systems. "Outflow module" refers to logic that services on-demand or scheduled requests for structured data for utilization by client apps and applications to generate structured user interfaces and graphical visualizations. "User" refers to a human operator of a client device. The ingest module may include a connection scheduler, a web integration service, and a normalizing module. "Connection scheduler" refers to logic that establishes connections between disparate computer server systems according to a connection cadence determined by cadence rules. "Connection cadence" refers to the rate and/or frequency of connection establishment for data transfers between disparate computer server systems. "Connection scheduler" refers to logic that establishes connections between disparate computer server systems according to a connection cadence determined by cadence rules. "Web integration service" refers to a container for a web service, providing an API between the web service and external logic.

"Normalizing module" refers to logic that transforms data received from disparate computer server systems in various and different formats into a common format. "Connection cadence" refers to the rate and/or frequency of connection establishment for data transfers between disparate computer server systems. "Cadence rule" refers to a logic setting that controls a rate and/or frequency of connection establishment and data transfers between disparate computer server systems. "Web service" refers to a service that listens for requests (typically at a particular network port) and provides functionality (e.g., Javascript, algorithms, procedures) and/or data (e.g., HTML, JSON, XML) in response to the requests.

"Hot connection module" refers to logic that maintains a communication session open across configured timeout conditions. "Metadata control setting" refers to settings that control the establishment of secure connections between disparate computer server systems. "Indexing module" refers to logic that transforms received data signals into a searchable index. "Arbitrator" refers to logic that manages contention for a shared computing, communication, or memory resource in a computer system. "Outflow engine" refers to engine logic utilized by the outflow module, where an engine is a logic component optimized to move and/or transform data according to specific algorithms with high performance.

Embodiments of a distributed computing platform are disclosed to seamlessly automate operational tasks across functional areas within an enterprise. The platform implements a scalable online system for data ingest, indexing, and outflow, with performance-enhancing rate matching between each stage. The disclosed system may be configured with named hierarchical filters. As new transactions occur, indexing is applied across a decoupling boundary, and hierarchical filters (called 'tags') are applied post-index for enhanced performance and customization without necessitating the instrumentation of each transaction.

Conventional indexing approaches write fields into each transaction that matches a condition (a 'tag'). "Tag" refers to a label associated with a filter condition. An example of a filter condition is a Structured Query Language or Boolean logic setting. An example of a tag (the format is just an example) is: September Large Transactions->"amount>$100 AND 9/1/2019<=date<=9/30/2019". This degrades performance as edits or changes to the tag or any aspect of the parameters utilized by the tag require the system to scan through the entirety of the index and make changes to each record utilizing the tag, and then re-index.

The disclosed system exhibits improved performance by de-coupling indexing from the parametric constraints of tagging and thus may better match indexing performance with a rate of data ingest and/or data outflow. Multilevel hierarchical tags may be configured so that a parent-child relationship is established through the application of iterative refinements. The indexing operates asynchronously from the data ingest across a decoupling boundary. When ingestion and normalization complete a push notification may be applied across the decoupling boundary to trigger operation of the indexing module to update the search index based on anchor tags in relational tables of the normalized data set. The system enables on-demand retrieval by client devices of highly customized information for use in analytics and reporting, based on recently and periodically acquired data sets from disparate computer server systems with improved performance and lower latency than is available with conventional approaches.

Figure 3:
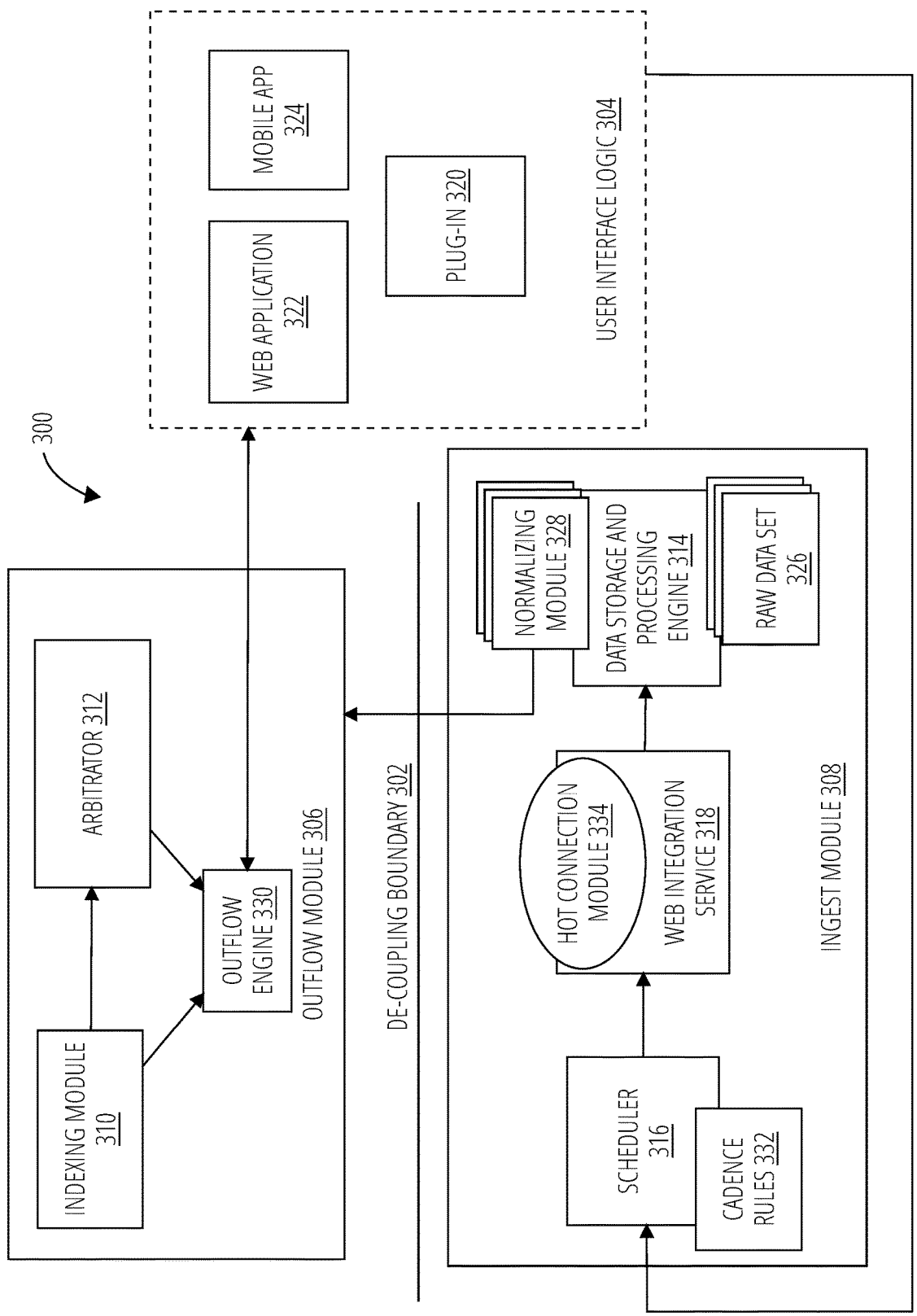
FIG. 3 depicts a distributed computing platform 300 in accordance with one embodiment.

FIG. 3 depicts a distributed computing platform 300 in one embodiment. At a high level, the distributed computing platform 300 comprises an ingest module 308 and an outflow module 306 that interoperate across a de-coupling boundary 302. "De-coupling boundary" refers to an interface between two communicating logic components that decouples the rate at which one component transforms its inputs to outputs from the rate at which the other component transforms its inputs to outputs. The ingest module 308 and outflow module 306 exchange data and control signals with user interface logic 304.

The ingest module 308 is operatively coupled to the user interface logic 304 and activates on a schedule to pull data from disparate computer server systems. "Disparate computer server systems" refers to physically distinct and separate computer systems operated by distinct and separate companies and accessible over distinct and separate communication channels from one another. The ingest module 308 is operatively coupled to the outflow module 306 and passes normalized data across the de-coupling boundary 302 to the outflow module 306. The outflow module 306 is communicatively coupled to the user interface logic 304 allowing a user to instrument a pipeline of normalized data from the ingest module 308 to the outflow module 306 and from there to the user interface logic 304 using hierarchical filter control settings, referred to herein as 'tags'.

The user interface logic 304 depicted here includes one or more of a mobile application 324, a web application 322, and a plug-in 320. The mobile application 324 and the web application 322 enable user interaction with and configuration of the distributed computing platform 300. The plug-in 320 provides an interface between a restful logic component such as Excel and the distributed computing platform 300.

The ingest module 308 comprises a connection scheduler 316, a web integration service 318, and a data storage and processing engine 314. The ingest module 308 is a serverless implementation that activates and deactivates services dynamically to ingest raw data from disparate computer server systems into a normalized format, according to individual schedules for each of the disparate computer server systems. "Serverless" refers to a computing system architected such that performance scalability is enabled by configuring, either automatically or via manually configured control settings, units of resource consumption (e.g., computational units, communication bandwidth, memory) rather than by adding or removing entire computer servers.

Data ingest is controlled by a connection scheduler 316 and cadence rules 332. The connection scheduler 316 utilizes the cadence rules 332 to operate the web integration service 318, which opens connections and pulls data for further processing by the data storage and processing engine 314.

A hot connection module 334 manages the connections utilized by the web integration service 318 to pull data from the disparate computer server systems. The web integration service 318 invokes a dynamic application programming interface (API) to each of the disparate computer server systems; each API may be specific to a particular server system and the connection via the API is controlled and maintained by the hot connection module 334.

The data storage and processing engine 314 operates a normalizing module 328 on a raw data set 326 received from the web integration service 318. This results in a normalized data set with consistent fields regardless of the specific format of the raw data sets from different ones of the disparate computer server systems. The normalizing module 328 utilizes a dynamically activated set of algorithms specific to the format of the data source. These algorithms perform functions such as file conversion, parsing, and analysis, and are well known in the art.

The connections established and maintained by the hot connection module 334 are "hot connections" that are opened and closed dynamically such that the connection is made persistent per rules established by institution-specific security protocols—OAuTH, tokenized, dual authentication etc. These rules may be configured in the hot connection module 334 or the connection scheduler 316 or both.

The connection scheduler 316 acts as a throttle/rate limiter based on a hierarchical prioritization of at least the following parameters:

1. institution restrictions on data access (connections or data amounts) per time interval
2. data availability or update schedules
3. user access privileges for the institution (what data are they allowed access to and how often)
4. institutional limits on data transfer amounts/rates per session Normalized data is communicated from the ingest module 308 to the outflow module 306 across the de-coupling boundary 302. The de-coupling boundary 302 is a computer resource utilization boundary separating the operation of the ingest module 308 and the outflow module 306. The de-coupling boundary 302 enables the ingest module 308 to operate independently and at a different rate from the outflow module 306; particularly the indexing module 310 of the outflow module 306 may operate asynchronously from the ingest and normalization of data by the ingest module 308.

The outflow module 306 comprises an arbitrator 312, an indexing module 310, and an outflow engine 330. The outflow module 306 is a serverless implementation for data delivery for which services are activated and deactivated dynamically per client. The indexing module 310 is operatively coupled to the arbitrator 312 which manages contention for the outflow engine 330 among the various clients requesting data via the user interface logic 304. The arbitrator 312 also controls the operation of the outflow engine 330 based on hierarchical filters configured via the web application 322. The outflow engine 330

The distributed computing platform 300 may, in one embodiment, serve as an example of a serverless cloud computing platform. "Serverless cloud computing platform" refers to a set of processing hardware (processors), memory hardware (non-volatile memory and/or volatile memory), storage hardware (storage devices), networking hardware, software, firmware, systems, subsystems, components, circuits, and logic configured to implement a cloud computing execution model. (Search "serverless computing." on Wikipedia.com Feb. 5, 2020. Modified. Accessed Feb. 5, 2020.) Examples of components, systems, architectures, functionality, and logic that may be included in a serverless cloud computing platform include AWS Lambda, AWS Dynamo, AWS RDS, AWS S3, AWS Elastic Search, Amazon SNS, and/or Amazon Gateway.

Figure 4:
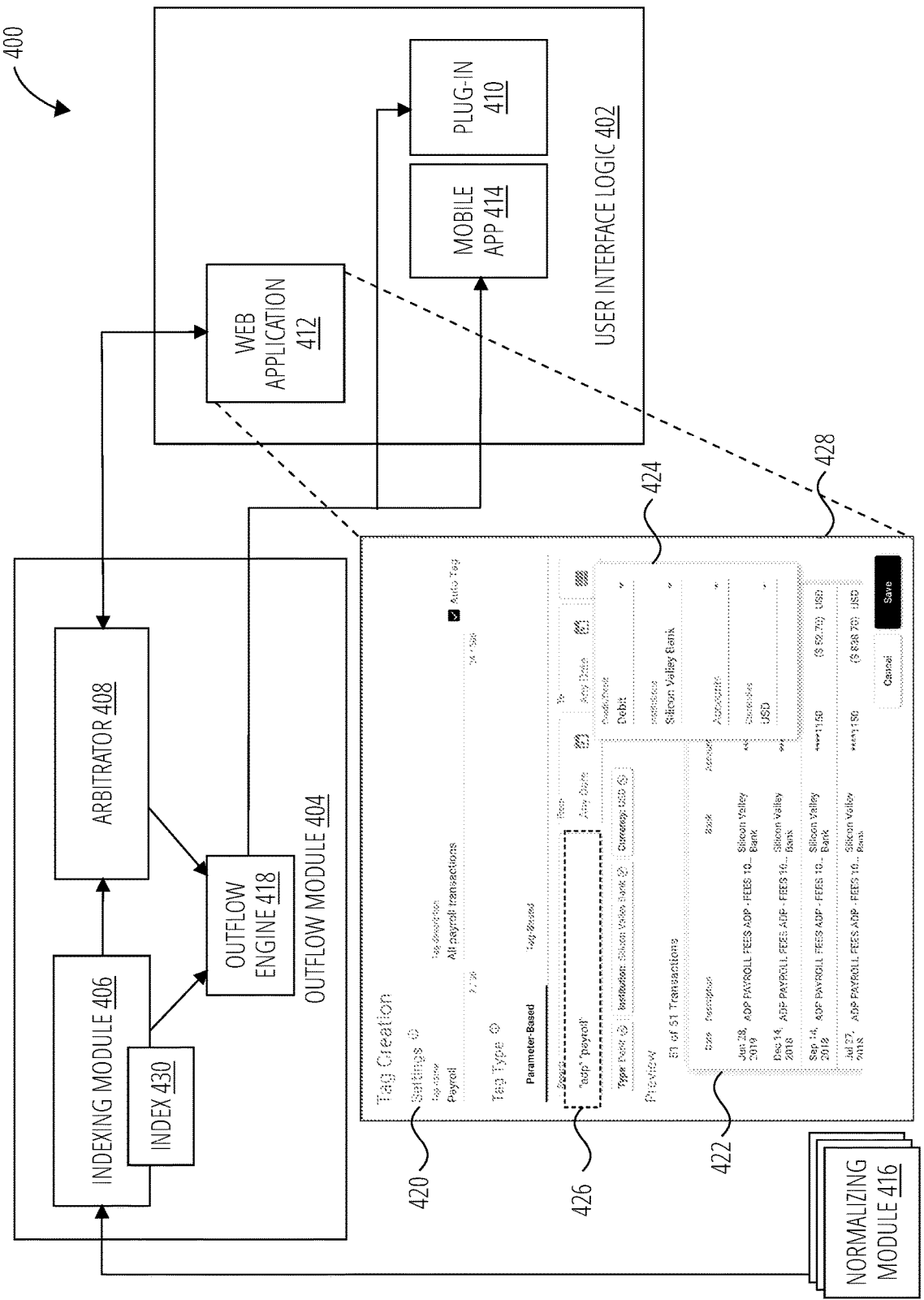
FIG. 4 depicts a controller configuration system 400 in accordance with one embodiment.

FIG. 4 depicts a controller configuration system 400 in one embodiment. The controller configuration system 400 as depicted includes some components of the distributed computing platform 300 but also includes additional aspects. The web application 412 is depicted in more detail and comprises tagging logic 428 that provides a tag descriptor setting 420, tag parameters 426, metadata 424, and a dynamic preview window 422.

The tagging logic 428 enables the configuration of tags comprising filter settings. The tag descriptor setting 420 is a label to concisely reference the tag for future use. The tag parameters 426 along with the metadata 424 form filter settings to apply to the normalized data generated by the ingest module. The metadata 424 may identify specific institutions, accounts, currencies, and/or transaction types. Other types of metadata 424 may also be selectable. The dynamic preview window 422 displays normalized data that would be associated with the tag as it is currently configured. To form a hierarchical filter, one or more tag descriptor setting 420 for existing tags may be set in the tag parameters 426. The tag parameters 426 may be generated in many ways, including explicit selections, search queries, and natural language inputs. The tag parameters 426 may be applied as "fuzzy" parameters as that term is normally understood in the art. Some of the tag parameters 426, such as the institutions and accounts, may be "anchor" settings that associate with specific records in one or more database comprising the normalized data.

Substantial performance improvements are realized by building the search index 430 based on relational tables in the normalized data set that includes fields for the anchor tag parameters 426, and then filtering search results generated from the index 430 for tag parameters 426 that are not anchored but instead implemented as filter restrictions applied to the outflow engine 418. The filter restrictions applied to the outflow engine 418 based on tag parameters 426 are formed dynamically (as client requests are received). The tag parameters 426 that are applied as filter settings may for example implement whitelist and blacklist conditions on the data communicated by the outflow engine 418.

The indexing module 406 is asynchronously coupled to the normalizing module 416 to receive the normalized data. The web application 412 is communicatively coupled to the arbitrator 408 to configure the arbitrator 408 with one or more configured tag for the outflow engine 418 to apply to the index 430 generated by the indexing module 406. The outflow engine 418 is operatively coupled to communicate the filtered data sets thus generated to the mobile application 414 and/or the plug-in 410 (for example).

Figure 5:
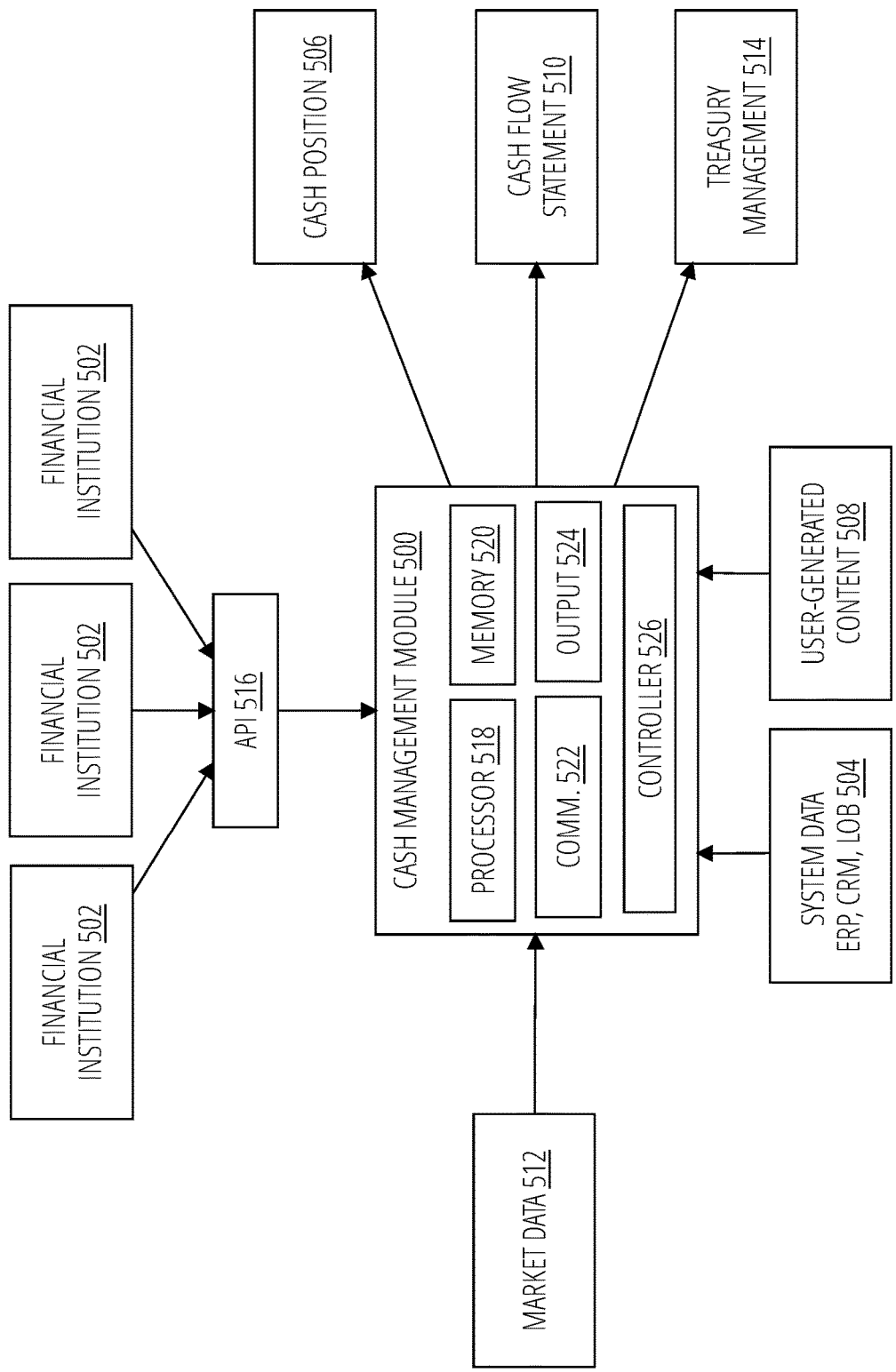
FIG. 5 illustrates a cash management module 500 in accordance with one embodiment.

FIG. 5 illustrates a cash management module 500. "Cash management module" refers to any hardware, circuit, component, module, logic, device, or apparatus configured, programmed, designed, arranged, or engineered to manage, combine, and operate on bank account transaction data, financial market data, and company system data each accessible using application programming interfaces (APIs) to report an aggregate cash level for a company. One example of a cash management module includes, but is not limited to, the Trovata® cash management module, available attrovata.io.

The cash management module 500 may be configured to seamlessly automate many of the operational tasks across all financial functional areas within an enterprise, which include accounting, financial planning and analysis (FP&A), and treasury. The cash management module 500 comprises a processor 518, a communication module 522, an output module 524, and a volatile memory media 520.

The communication module 522 of the cash management module 500 may receive inputs, such as bank data from financial institutions 502, market data 512, system data 504, such as ERP, CRM, Line of Business (LOB) data, or the like, and user-generated content 508. "ERP" refers to an acronym for enterprise resource planning. The cash management module 500 provides a hub for financial data aggregation, and includes a machine-readable medium storing non-transitory instructions (volatile memory media 520) that enables one or more computer processors 518 to execute software algorithms to make associations between data elements to compute, analyze, and predict financial results. The outputs of the cash management module 500 may include a cash position 506, a cash flow statement 510, and a treasury management 514.

"Cash position" refers to the amount of cash that a company, entity or, financial institution holds on its books at a specific point in time. In certain embodiments, a cash position is as current, temporally, as the financial institutions that hold the cash will disclose with respect to the most recent transactions on a cash account. In other words, if the financial institution does not report cash transactions that are presently unsettled, then those unsettled cash transactions will not be reflected in the cash position. Of course, once the unsettled cash transactions settle in the future, then those cash transactions will be reflected in the cash position reported at that future time. In addition to cash, it also takes highly liquid assets such as marketable securities, Certificate of deposit and other cash equivalents into account. (Search "cash position" on mbaskool.com Sep. 19, 2019. Accessed Oct. 21, 2019) Treasury management 514 comprises data and features and functions for managing treasury responsibilities for a company.

The cash management module 500 may include a processor 518 and volatile memory media 520 for storing instructions. The processor 518 may execute the instructions to receive financial data over a network by way of an application programming interface (API 516). The term "application programming interface" refers to instructions implementing entry points and return values to a module. In one embodiment, the processor 518 may obtain financial data from a financial institution for each cash account of the company. "Cash account" refers to an account with a financial institution that holds cash. Alternatively, or in addition, the processor 518 may obtain financial data from an enterprise resource planning (ERP) system. "Financial data" refers to data relating to, or representative of, a financial transaction that occurred in the past, in a present financial transaction, or at a future financial transaction. Alternatively, or in addition, the processor 518 may obtain financial data from user-generated content. The processor 518 may execute the instructions to determine the cash position for the company and to generate one or more financial statements, including a cash flow statement.

"Financial transaction" refers to an agreement, or communication, carried out between a buyer and a seller to exchange an asset for payment. A financial transaction involves a change in the status of the finances of two or more businesses or individuals. The buyer and seller are separate entities or objects, often involving the exchange of items of value, such as information, goods, services, and money. A financial transaction is still a transaction if the goods are exchanged at one time, and the money at another. This is known as a two-part transaction: part one is giving the money, part two is receiving the goods. (search "financial transaction." on Wikipedia. Jul. 3, 2019. Accessed Oct. 18, 2019.) In one embodiment, financial transactions are recorded and tracked by a financial institution in financial accounts, such as bank accounts. The financial accounts track a current amount of cash owned by a company and being managed by the financial institution. Financial data representing the amount of cash in a company owned financial account may reflect the real time or near real time account balances for the financial accounts. In certain embodiments, financial data representing financial transactions may be current in the financial accounts and made available to a cash management module within 24-72 hours of completion of the financial transaction. Such financial data representing financial transactions that represents financial transactions completed within a prior 24-72 hour period are referred to herein as settled transactions or settled financial transactions. In certain embodiments, a cash management module determines a cash position based on settled financial transactions.

"Cash flow statement" refers to a financial statement that provides aggregate data regarding all cash inflows a company, or part of a company, receives from its ongoing operations and external investment sources. It also includes all cash outflows that pay for business activities and investments during a given period. (Search "cash flow statement" on investopedia.com. Sep. 19, 2019. Accessed Oct. 21, 2019.

"Financial statement" refers to formal records of the financial activities and position of a business, person, or other entity. Relevant financial information is presented in a structured manner and in a form, which is easy to understand. They typically include four basic financial statements accompanied by a management discussion and analysis: A balance sheet or statement of financial position, reports on a company's assets, liabilities, and owners' equity at a given point in time. An income statement—or profit and loss report (P&L report), or statement of comprehensive income, or statement of revenue & expense—reports on a company's income, expenses, and profits over a stated period of time. A profit and loss statement provides information on the operation of the enterprise. These include sales and the various expenses incurred during the stated period. A statement of changes in equity or equity statement, or statement of retained earnings, reports on the changes in equity of the company over a stated period of time. A cash flow statement reports on a company's cash flow activities, particularly its operating, investing and financing activities over a stated period of time. (Search "financial statement." on Wikipedia. Oct. 15, 2019. Accessed Oct. 15, 2019.)

In some configurations, the communication module 522 may access financial data over a network by way of an application programming interface (API 516) from a one or more of a financial institutions 502 for each cash account of the company, an enterprise resource planning (ERP) system, and user-generated content. The cash management module 500 may include a controller 526 to determine the cash position for the company. "Controller" refers to a hardware, device, component, element, circuitry, logic, or circuit configured to manage and control operation of another software, hardware, firmware, system, sub-system, device, apparatus, or logic unit, component, device, or component. The controller 526 may provide the cash position to the output module 524 to communicate the information the user.

In certain embodiments, a user of the cash management module 500 may provide user-generated content 508 using one or more of the cash position 506, cash flow statement 510, and treasury management 514. In one or more embodiments, a single user or a team of users may generate user-generated content 508 using manual processes, automated processes, other business systems, or a combination of these. The term "user-generated content" refers to financial data supplied by a user for use in managing cash flow(s) and cash flow analysis. In one embodiment, user-generated content may include one or more cash forecasts built based on input, direction, advice, projections, plans, and goals provided by one or more users. Certain embodiments may provide data and tools to a user to enable the user to generate the user-generated content. For example, a user may reference a cash position, a cash flow statement, and/or treasury management information in order to generate user-generated content, including, but not limited to, cash forecasts.

In one embodiment, the user users the cash management module 500 to define and generate the user-generated content 508. For example, logic modules of the cash management module 500 may interact with the user to enable the user to define one or more cash forecasts that may serve as user-generated content 508 for the cash management module 500.

In one embodiment, a user of the cash management module 500 may produce, inform, and/or augment user-generated content 508 using one or more of the cash position 506, cash flow statement 510, and treasury management 514. In certain embodiments, a single user, or a team of users, may collaborate to generate the user-generated content 508. The cash management module 500 enables the user to access real time cash flow data in order to develop the user-generated content 508. Using current cash position 506 information a user may develop a cash forecast as, or as part of, the user-generated content 508. The user may generate the cash forecast based on known business decisions, the user's past experience, known business risks, and one or more outlooks for the company (e.g., optimistic, conservative, and/or pessimistic).

Figure 6:
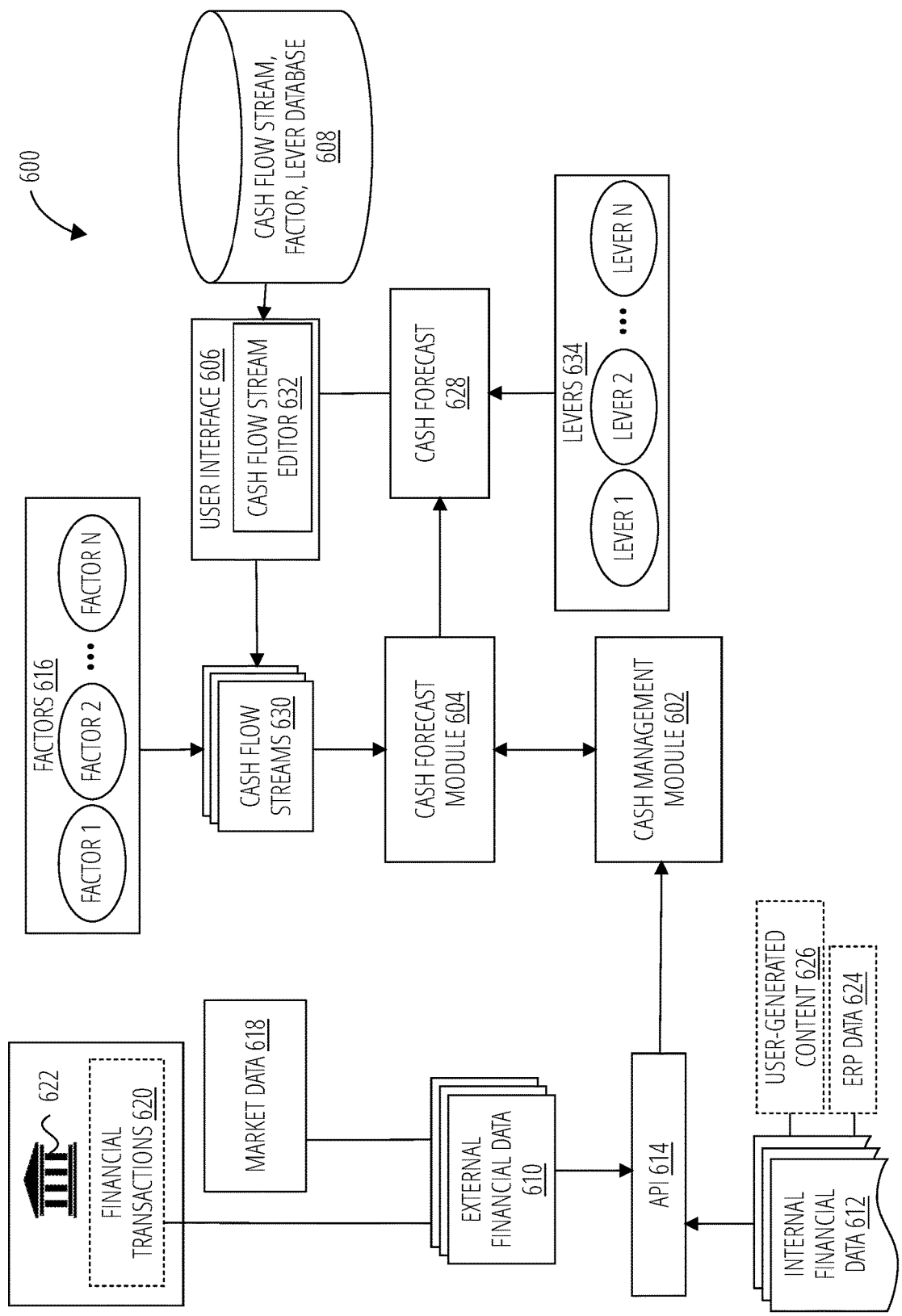
FIG. 6 illustrates a cash forecasting system 600 in accordance with one embodiment.

FIG. 6 illustrates a cash forecasting system 600 in accordance with one embodiment. The cash forecasting system 600 comprises a cash management module 602, a cash forecast module 604, a user interface 606, and a cash flow stream, factor, lever database 608.

The cash management module 602 may comprise any hardware, circuit, component, module, logic, device, or apparatus configured, programmed, designed, arranged, or engineered to manage, combine, and operate on bank account transaction data, financial market data, and company system data each accessible using application programming interfaces (APIs) to report an aggregate cash level for a company. One example of a cash management module includes, but is not limited to, the Trovata® cash management module, available at trovata.io. The cash management module 602 receives external financial data 610 and internal financial data 612 through an API 614. The external financial data 610 comprises market data 618 and financial transactions 620 from at least one financial institution 622. The internal financial data 612, in one embodiment, comprises ERP system financial data 624 and user-generated content 626, such as spreadsheet data.

The cash management module 602 may determine a cash position for a company based on at least financial transactions 620 and ERP system financial data 624. "ERP system financial data" refers to Financial data supplied by an ERP system. In certain embodiments, financial data available from an ERP system includes a variety of possible financial data sources including, but not limited to, open accounts receivable (A/R) and accounts payable (A/P) invoices; open purchase orders (POs) with both vendors and customers; payments made by payment type and related details such as payment date; vendor payment terms (payables) and/or customer collections terms (receivables); chart of accounts, including account codes by vendor and/or customer for expense and revenue recognition, respectively, and the like; and cash transactions posted to the general ledger that can be used to aid in reconciliation, such as outstanding checks, in order to make cash flow estimates more accurate. The cash management module 602 communicates the cash position to the cash forecast module 604. "Cash forecast module" refers to any hardware, circuit, component, module, logic, device, or apparatus configured, programmed, designed, arranged, or engineered to determine a cash forecast.

The cash forecast module 604 generates a cash forecast 628. In one embodiment, the cash forecast module 604 may use a cash flow stream 630 to generate the cash forecast 628. "Cash flow stream" refers to a projected cash flow for a specific part of a company. In one embodiment, at a broad level, the cash flow represents cash flow for all operations of a company and is analogized to a river. Consequently, a cash stream is also a cash flow but represents a smaller portion of all of the operations of the company and therefore is analogized to a stream which is smaller than, and feeds into a river.

A cash flow stream is a projection of financial data representing cash flows, in or out, relating to a particular type of business transaction, such as income or expenses. The claimed solutions may generate streams in a number of ways, including, without limitation, auto-generated with tags, user-defined scripts that a serverless cloud computing platform may execute, or manually with user-generated content using entered data or user uploaded files, such as a spreadsheet.

Said another way, a cash flow is a grouping of financial transactions and other business activity that affects a company's cash position and a cash stream is a subset of that grouping of financial transactions and other business activity that affects a company's cash position. "Cash flow stream" and "stream" are used synonymously herein to mean a cash stream and references to "stream" with an adjective such as in "revenue stream" are synonymous with the term "revenue cash stream."

Examples of a cash flow stream include, but are not limited to, revenue stream, general expenses stream, accounts payable stream, accounts receivable stream, inventory stream, capital expenditures stream, payroll stream, financing stream, and the like. In one embodiment, a cash stream may be defined to include an exclusive grouping of cash uses, such as expenses and/or other business activities that use cash. In one embodiment, a cash stream may be defined to include an exclusive grouping of cash sources, such as revenue, accounts receivable payments, and/or other business activities that use cash. In yet another embodiment, a cash stream may be defined to include a grouping of both cash uses, such as expenses, and cash sources, such as revenue.

The cash forecast module 604 may comprise any hardware, circuit, component, module, logic, device, or apparatus configured, programmed, designed, arranged, or engineered to determine a cash forecast 628. The cash forecast 628, in one embodiment, comprises a projection, or an estimate, of the timing and amounts of cash inflows and outflows over a specific time period. In some instances, the forecast or projection may predict cash inflows and outflows over a period of a year.

A cash flow forecast, also referred to as a cash forecast 628, is useful for decision makers to decide if a company needs to borrow money, how much money to borrow, when to borrow the money, and how the company will repay a loan. A cash flow forecast may also be called cash flow budget or cash flow projection. (Search cash flow forecast on www.businessdictionary.com. Modified. Last accessed Dec. 30, 2019). The cash forecast module 604, in one embodiment, generates a cash forecast 628 based on the cash position and one or more cash flow streams 630, each cash flow stream may represent a cash flow for one aspect of the company, and each cash flow stream may comprise one or more factors, each factor configured to affect an associated cash flow stream in the future.

The user interface 606 enables a user to view, review, or edit a cash forecast 628, a cash flow stream 630, or adjust or revise cash forecasts. The user interface 606 may provide a user access to a cash flow stream editor 632. The user interface 606 may also include a graphical user interface configured to display information to the user to help them to access, configure, control, execute, or terminate a cash forecast 628, a cash flow stream 630, one or more factors 616, and/or one or more levers 634. The cash flow stream editor 632 enables a user to select a cash flow stream 630 as well as one or more factors 616 associated with the cash flow stream 630 to be utilized by the cash forecast module 604.

In one embodiment, a user may design, configure, build, or edit a consolidated cash forecast. A consolidated cash forecast is a combination of one or more cash forecasts. The user interface 606 provides the user with a variety of options for working with cash forecasts. In one embodiment, a user may copy or duplicate an existing cash forecast to create a new cash forecast and alter various attributes and/or characteristics of the new cash forecast. For example, a user may add, remove, or modify one or more levers relating to the new cash forecast. The levers may affect a cash forecast at a macro level.

In one embodiment, a cash flow stream, factor, lever database 608 may comprise a data structure that allows for storage, access, modification, and retrieval of data corresponding to a plurality of cash flow streams 630 as well as the one or more factors 616 associated with each cash flow stream 630 accessible by the user through the user interface 606. The cash flow stream, factor, lever database 608 may also include zero or more levers (e.g., one or more levers 634) that associate with one or more cash forecasts 628. The cash flow stream, factor, lever database 608 may be configured to assist a user in identifying a cash flow stream 630 and in identifying one or more factors 616 from various sources including external financial data 610 and internal financial data 612 to be utilized by the cash management module 602. The cash flow stream, factor, lever database 608 may also track and store associations between cash flow streams 630 and one or more factors 616 and cash forecasts 628 and one or more levers 634.

In the cash forecasting system 600, the user interface 606 configures a cash flow stream 630 for use by the cash forecast module 604 through a cash flow stream editor 632. The cash flow stream editor 632 allows users to select, define, and/or edit cash streams and factors for a generating a cash forecast 628. In one embodiment, a user may generate the cash flow stream and/or factors from scratch. In another embodiment, one or more of the cash flow streams and/or factors may come from the cash flow stream, factor, lever database 608.

Each cash flow stream 630 may represent a cash flow for one aspect of the company. In one embodiment, each cash flow stream comprises, or is associated with, one or more factors 616. A factor may be configured to affect an associated cash flow stream in the future, depending on what attributes or characteristics the factor relates to. In one embodiment, the one or more factors 616 associated with a cash flow stream describe a behavior in a cash flow stream 630 such as a change in the inflow or outflow of cash during a period of time. The behavior may be associated with an event such as the release of a new product and the tracked change could be a change in revenue that directly correlates with the sale of the new product. By including factors, the cash forecast module 604 may adjust the cash flow stream to account for the changes over time and thereby improve a cash forecast 628.

Figure 7:
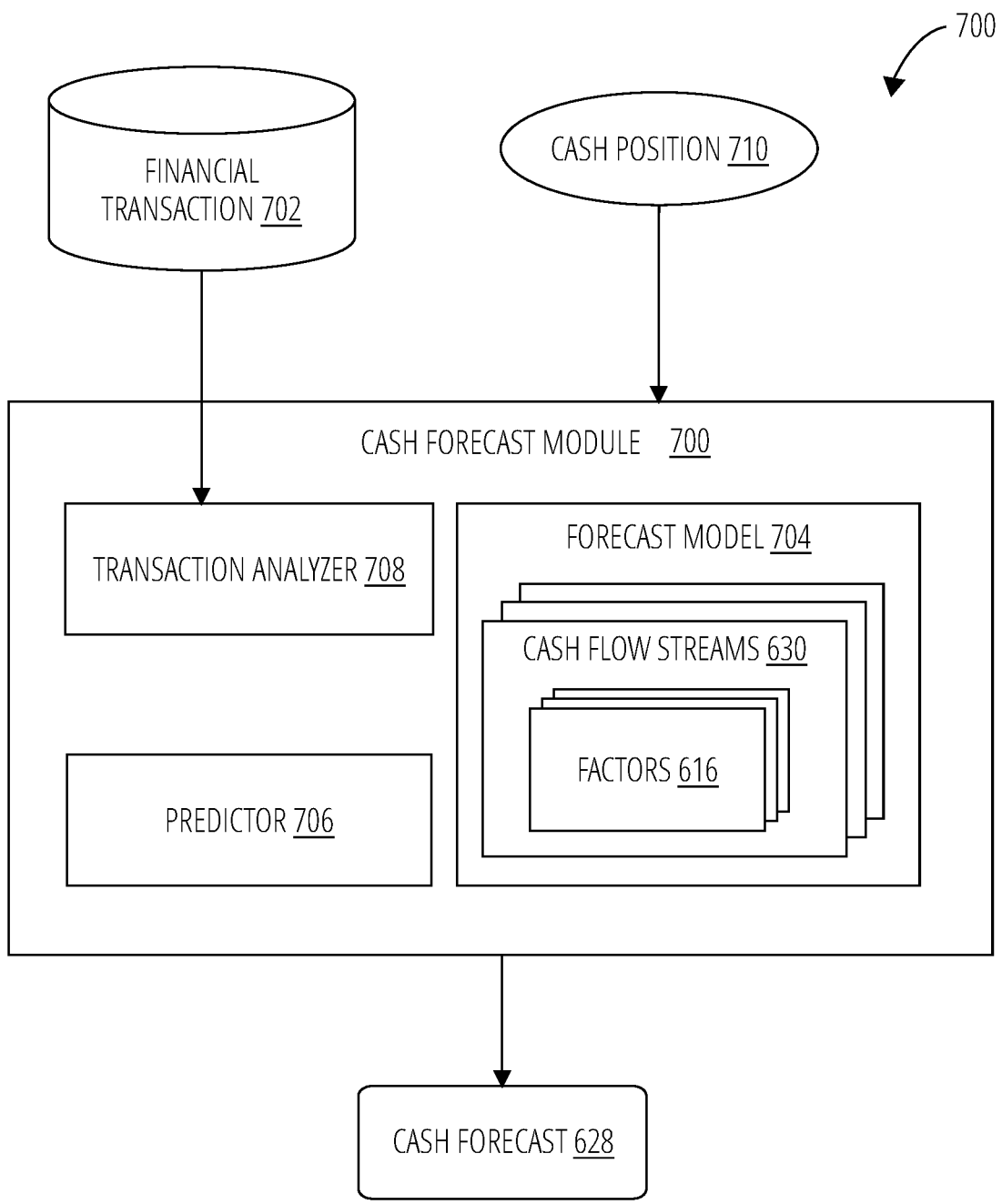
FIG. 7 illustrates a cash forecast module 700 in accordance with one embodiment.

FIG. 7 illustrates a cash forecast module 700 in accordance with one embodiment. The cash forecast module 700 comprises a transaction analyzer 708, a predictor 706, and a forecast model 704 comprising one or more cash flow streams 630 with each cash flow stream comprising one or more factors 616. The cash forecast module 700 utilizes a cash position 710 and a set of financial transactions 702 to determine a cash forecast 628.

The transaction analyzer 708 may determine a relationship between one or more historical financial transactions 702 and one or more cash flow streams 630. "Relationship" refers to a magnitude and rate of change in either a positive or negative direction for a cash position of a cash flow stream. In one embodiment, the relationship is based at least in part on historical cash financial transactions. In another embodiment, the relationship is based at least in part on historical cash financial transactions for this particular cash flow stream. "Historical financial transaction" refers to a financial transaction that occurs in the past. Said another way, the transaction analyzer 708, in certain embodiments, may determine how one or more financial transaction affect the one or more cash flow stream 630.

The transaction analyzer 708 may identify a particular set of financial transactions based on a name or description for the transaction(s) (e.g., payroll, inventory, etc.,), the source of the transaction (e.g., financial institution, EPR system, etc.,) as well as other identifiable metadata associated with the particular transactions. In addition, the transaction analyzer 708 may further identify transactions to associate with a cash flow stream by a tag associated with an existing stream such that a cash flow stream may include financial transaction 702 associated with more than one cash flow stream.

The predictor 706 may project a future cash flow for each of the one or more cash flow streams 630 based on the relationship between a financial transaction 702 and the cash flow stream 630. "Future cash flow" refers to a cash flow for a distinct point in time or a period of time in the future. The predictor 706 may project a cash flow stream value at a time in the future, provided that each associated factor occurs between not and that time in the future. In one embodiment, the predictor 706 employs and/or comprises a neural network. In certain embodiments, the neural network used may be pre-trained. In other embodiments, the neural network used may train based on financial transaction available to the predictor 706 and feedback from a user.

"Neural network" refers to any logic, circuitry, component, chip, die, package, module, system, sub-system, or computing system configured to perform tasks by imitating biological neural networks of people or animals. (Search "Artificial neural network" on Wikipedia.com Jul. 29, 2019. Accessed Aug. 16, 2019.) Neural network, as used herein, may also be referred to as artificial neural network (ANN). Examples of neural networks that may be used with various embodiments of the disclosed solution include, but are not limited to, convolutional neural networks, feed forward neural networks, radial basis neural network, recurrent neural networks, modular neural networks, and the like.

A neural network may include both the logic, software, firmware, and/or circuitry for implementing the neural network as well as the data and metadata for operating the neural network. One or more of these components for a neural network may be embodied in one or more of a variety of repositories, including in one or more files, databases, folders, or the like.

The neural network used with embodiments disclosed herein may employ one or more of a variety of learning models including, but not limited to, supervised learning, unsupervised learning, and reinforcement learning. These learning models may employ various backpropagation techniques.

The one or more factors 616 associated with each of the cash flow stream 630 may be utilized to adjust the projected future cash flow from each cash flow stream 630. The one or more factors 616 associated with a cash flow stream describe a behavior within a cash flow stream such as a change in the inflow or outflow of cash during a period of time. The behavior may be associated with an event such as the release of a new product and the tracked change could be a change in revenue that directly correlates with the sale of the new product. By including factors, the predictor 706 may be able to adjust data in the cash flow stream to account for the changes and improve the predicted future cash flow for each cash flow stream.

The factors may also be configured to account for rate changes such as a percentage change factor. A percentage change factor is a factor configured to change the cash flow for a cash flow stream by a predetermined percentage over time with a predefined frequency. For example, in one embodiment, the percentage change factor comprises a percentage increase, for example, 0.025%, with a frequency interval, such as each future pay period or every three days. In another example, in one embodiment, the percentage change factor comprises a percentage decrease, for example, 0.025%, with frequency interval, such as each seven days.

The factors may also be configured to account for expected time shift changes for certain behaviors through a time shift factor. "Time shift factor" refers to a factor configured to change the cash flow for a cash flow stream by a calculated amount based on a timing policy for a financial transaction shifting earlier in time or later in time.

For example, In one embodiment, the time shift factor is defined such that all invoices payable by the company are shifted "x" number of days forward in time, accelerating the payments beyond a payment policy and the associated cash flow stream is adjusted by the amount that this factor changes the cash flow. For example, in another embodiment, the time shift factor is defined such that all invoices payable by the company are shifted "x" number of days backward in time, delaying the payments beyond a payment policy and the associated cash flow stream is adjusted by the amount that this factor changes the cash flow. In another example embodiment, the time shift factor is defined such that all invoices due to the company are shifted "x" number of days forward in time, accelerating the collections beyond a payment policy and the associated cash flow stream is adjusted by the amount that this factor changes the cash flow. For example, in another embodiment, the time shift factor is defined such that all invoices due to the company are shifted "x" number of days backward in time, delaying the collections beyond a payment policy and the associated cash flow stream is adjusted by the amount that this factor changes the cash flow.

"Forecast model" refers to a set of parameters, data values, assumptions, and events, or potential events, that a user wants to use as a basis for generating a cash forecast. In certain embodiments, the user interface 606 may include an editor (not shown) for a user to use to define, edit, revise, copy, and delete forecast models 704. In one embodiment, the forecast model 704 comprises logic configured to project how the one or more factors 616 impact one or more cash flow streams 630 based on the financial transactions 702. In one embodiment, the forecast model 704 comprises a set of cash streams and relations between them and factors that influence how the forecast model 704 changes in view of different transactions or other input information.

The forecast model 704, in one embodiment, may project an impact of future cash flows for each of the cash flow streams 630. The predictor 706 may then combine the cash flow predictions into the forecast model 704 describing the combined, expected, cash flow changes for one or more of the cash flow streams 630. The predictor 706 may utilize the cash position 710 as a current cash position and generate a cash forecast 628 using the forecast model 704. The cash forecast 628 describes the future cash flow for the selected cash flow stream 630 including the adjustments based on each associated one or more factors 616 relative to a current cash position.

Figure 8:
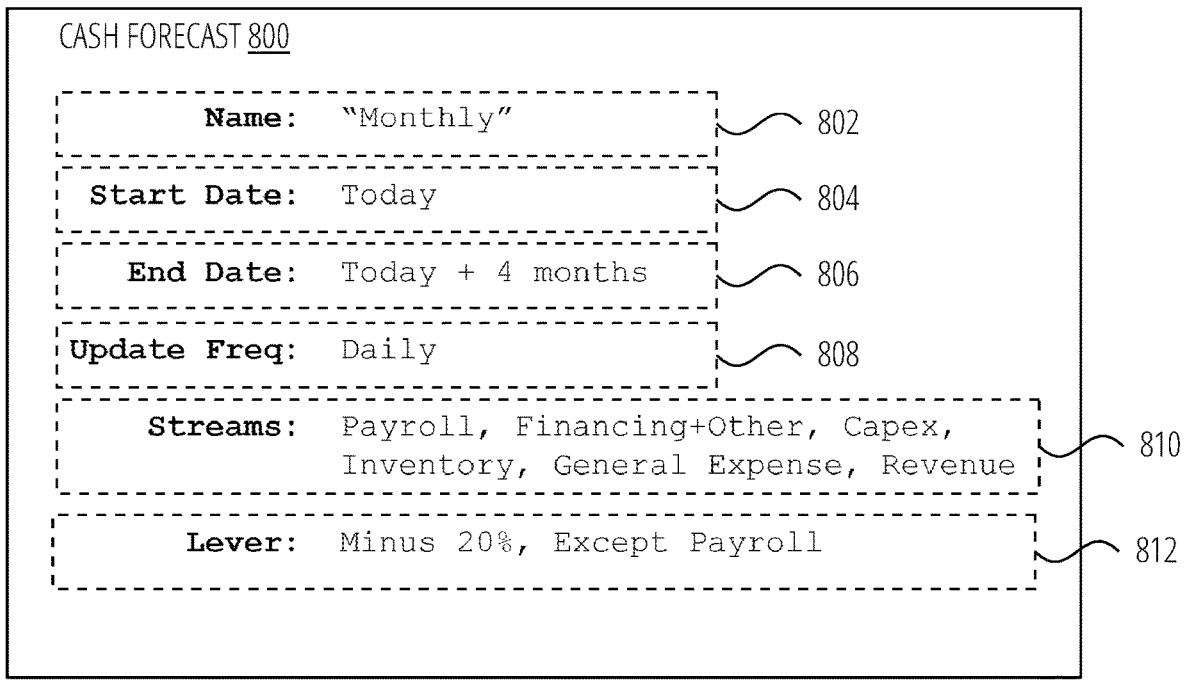
FIG. 8 illustrates a cash forecast 800 in accordance with one embodiment.

FIG. 8 illustrates a cash forecast 800 in accordance with one embodiment. In one embodiment, a cash forecast 800 defines how cash flow stream will change over time, given certain factors associated with reach cash flow stream. The cash forecast 800 comprises a forecast name 802, a start date 804, an end date 806, an update frequency 808, and at least one cash flow stream 810.

The forecast name 802 may be a description of a time period that a user wishes to view or another name that a user wishes to assign. For instance, a user may name the forecast name 802 after an applicable month or fiscal quarter to allow easy identification of the forecast when searched or reviewed. The start date 804 and the end date 806 are the date ranges for generating the cash forecast 800, for instance the start date 804 in the cash forecast 800 indicates that start of the range is "today" and the end of the range is "today+4 months" indicating that the range is 4 month range. The start date 804 and end date 806 may be used by a cash forecast module 604 to determine which historical financial transactions are applicable to a particular cash forecast 800.

The update frequency 808 is the interval by which the forecast information updates the collected financial data. In some instances, the information may be updated based on the data collected from the cash management module 602 or updated based on changes from the user interface 606. In some instances, the update frequency 808 updates the forecast model 704 with the updated financial information.

The cash flow stream 810 identifies one or more cash flow streams in the historical financial transaction data from to use for generating a cash forecast 628. Examples of cash flow streams that may be included in a cash forecast 800 are: a payroll stream, a financing stream, a capex stream, an inventory stream, a general expenses stream, a revenue stream, a leasehold income stream, and the like. In certain embodiments, a cash forecast 800 may include one or more cash flow streams. In another embodiment, a cash forecast 800 may include no cash flow streams 810.

A cash forecast 800 may include no levers 812, or may include one or more levers 812. The levers 812 represent a macro level characteristic that influences or is related to the cash forecast 800. "Lever" refers to a characteristic or attribute relating to a cash forecast. A lever is similar to a factor, except that a lever affects an entire forecast (e.g., all streams and factors) at a macro level.

A lever is similar to a factor with the main difference that, in one embodiment, a lever affects each cash flow stream and each factor that a cash forecast may have. In another embodiment, a lever may affect one or more cash flow streams and one or more factors of a cash forecast. A lever is a powerful condition, criteria, or attribute that a user may apply to a cash forecast. By using a lever, a user is able to quickly generate new or revised cash forecasts that model the impact of a particular lever.

For example, suppose an external event or condition (also referred to as a business scenario) in a particular geographic region, industry, or sector exists or has a high risk of occurring in the future. The event or condition could be a negative or a positive influence on cash flow for a business. Suppose the event or condition represents a recession risk, a negative influence on cash flow, a finance team (one or more users) may want to run some scenarios to understand the impact on cash and liquidity of the overall business being down by 20%. Such a cash forecast could help them determine how deep of cuts to payroll or employee layoffs may be needed.

To determine such a cash forecast, a user may setup or configure a specific "Lever" defined, for example, to state "minus 20%, except payroll." Such a lever would then calculate and adjust down all non-payroll streams within the cash forecast by 20%. This permits a finance team to quickly model out a scenario, captured in the lever, without having to set up many factors that would have to be applied to each individual stream within the cash forecast, which could be very time consuming. Hence, use of one or more levers gives the cash forecasting great leverage like a fulcrum to run scenarios quickly to "tune" a cash forecast.

In another example, suppose a company is anticipating a loss of $50 M over the next year and has only had $30 M in the bank. Such a company could define a lever to adjust a cash forecast at a macro level or a certain period of time to model the cash position in the future. Such a cash forecast may help the business determine to layoff 250 employees in order to keep the company solvent.

Levers provide an easy macro level way for cash forecasts to take account of macro level adjustments. A user can adjust a lever to see a cash forecast based on a positive cash flow or negative cash flow impact the impact from changes to 10%, then 15%, then 20%, etc. The adjustments are reflected in the cash forecast and associated consolidated cash.

In one embodiment, a set of levers may be predefined. In another embodiment, a user may edit predefined levers. In another embodiment, a user may define levers that reflect the changes specific to the user's needs. Levers may come in different varieties and can be used to quickly model out different scenarios at a high level to see the cash effect using macro driven assumptions.

Figure 9:
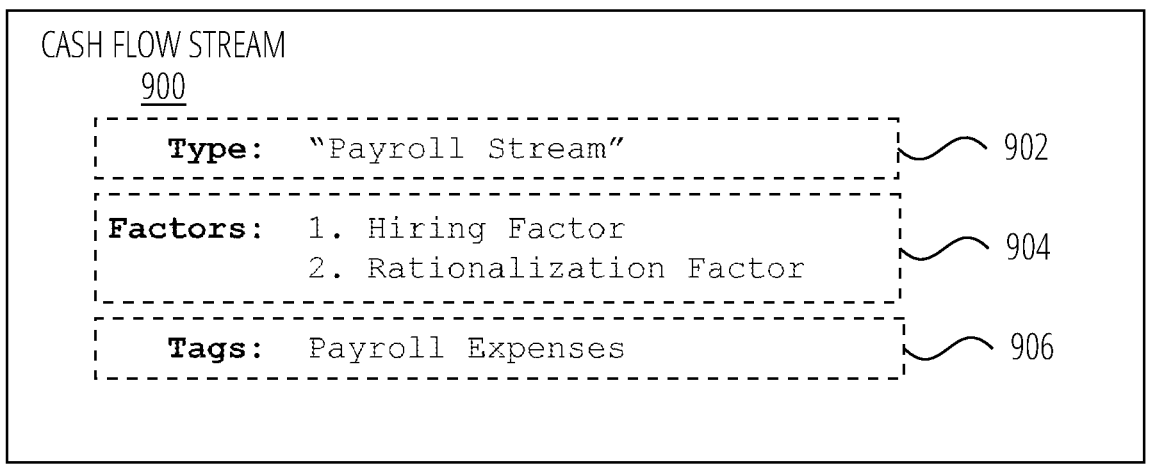
FIG. 9 illustrates a cash flow stream 900 in accordance with one embodiment.

FIG. 9 illustrates a cash flow stream 900 in accordance with one embodiment. The cash flow stream 900 identifies a category of financial data collected by a cash management module 602 to be utilized to generate the cash forecast, among other uses. In some instances, a user enters assumptions for the cash forecast by configuring the one or more cash streams for a specific part of a company.

The cash flow stream 900 comprises a cash flow stream type 902 may include one or more factors 904. The cash flow stream type 902 indicates the category of financial data, or business activity, or part of a company, to be utilized to generate the cash forecast. For instance, "payroll stream" indicates that the cash flow stream to be utilized corresponds to payroll related cash flows. Other types of cash flow streams 900 may include an "HR stream", an "OPex stream", an "accounts payable stream", and the like.

The one or more factors 904 may indicate potential conditions, restrictions, limitations, presumptions, and/or assumptions, that may affect the cash flow associated with the payroll stream. For instance, the example factors 904 may include a hiring factor and a rationalization factor that may each modify the cash flow of the cash flow stream during a cash forecast time period. The hiring factor define a potential change in the cash flow of the stream, as new hires are brought into the company. Each new hire would increase expenses associated with payroll. The rationalization factor may affect the cash flow stream 900 as reorganization actions of the company may lead to an expansion, or reduction, in the work force, thus an increase, or decrease, in payroll expenses. In certain embodiments, a cash flow stream 900 may include no factors. In one aspect, a cash flow stream 900 with no factors may be used in a cash forecast as a standalone cash flow stream. Later a user may or may not add a factor to a cash flow stream without any factors. A cash flow stream 900 without a factor may capture natural influences on the cash flow stream 900 without applying a particular factor.

In some configurations, the cash flow stream 900 may include a tag 906. The tag 906 may be an identifier corresponding to a named search parameter or metadata parameter utilized by the cash management module 602 to classify certain financial transactions. The cash forecast 628 may use a tag 906 to identify financial transactions associated with the cash flow stream. For instance, the tag 906 indicates "Payroll Expenses" which may indicate the named search parameter for the cash management module to use to identify a particular class of financial transaction associated with the payroll stream. The cash flow stream 900 may include a combination of cash source financial transactions and cash use financial transactions. A tag 906 may be used to include both cash source financial transactions and cash use financial transactions. For example, a cash flow stream 900 may include two tags 906, one associated exclusively with expenses (e.g., cash use financial transactions) and one associated exclusively with income (e.g., cash source financial transactions).

Figure 10:
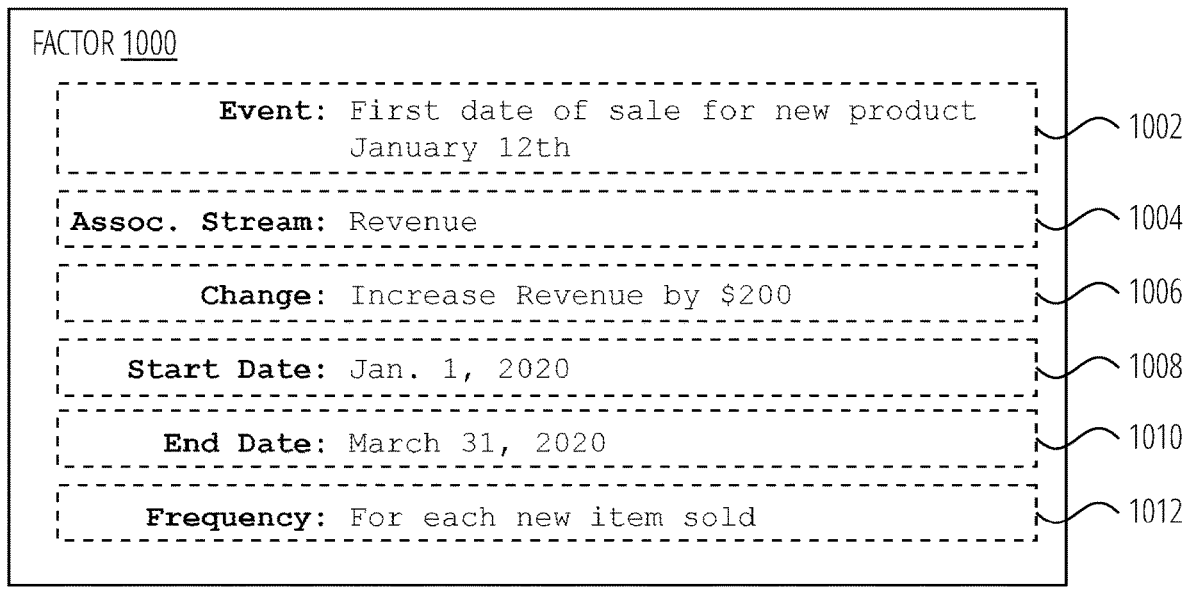
FIG. 10 illustrates a factor 1000 in accordance with one embodiment.

FIG. 10 illustrates one example of a factor 1000 in accordance with one embodiment. The factor 1000 may be a collection of parameters, settings, or values that impact a cash flow of at least one cash steam. The factor 1000, in one embodiment, includes an event 1002, at least one associated cash flow stream 1004, a change 1006, a start date 1008, an end date 1010, and a frequency 1012.

The event 1002 may describe a future event that may modify the cash flow of at least one particular cash flow stream. For instance, the event 1002 may describe a future first date of sale for a new product and indicate that date of the event is January 12th. In one embodiment, a date in the event 1002 description may be used by the cash forecast module 700 to determine whether or not a particular factor 1000 applies. In another embodiment, the event 1002 may be a text description and the cash forecast module 700 may use the start date 1008 to track when to apply a particular factor 1000.

The associated cash flow stream 1004 may indicate the cash flow stream affected by the future event. For instance, the associated cash flow stream 1004 describes "Revenue" as the cash flow stream affected by the event 1002.

The change 1006 is a parameter that defines how the cash flow stream, associated cash flow stream 1004, will change due to the factor 1000. In this example, the change 1006 is for an increase in revenue by $200. Alternatively, or in addition, the change may indicate a decrease in a value related to the cash flow. For example, the factor 1000 may be a cost factor and occurrence of the event may result in a decrease to cash on hand. The change 1006 may indicate the magnitude of the change explicitly or the magnitude may be derived from financial transaction referenced by the cash forecast module 700. For example, sales of a product may be captured in a different factor and the amount of increase in revenue may be based on the sale price less a predefined cost of goods sold (COGS).

In certain factors, the change 1006 may be tied to a frequency 1012 which indicates that the change may occur "for each new item sold." Alternatively, the change 1006 may be based on a time period such as each month, or each week, or each quarter.

The start date 1008 and the end date 1010 may indicate a date range during which the change 1006 may occur, and/or when the factor 1000 is applicable. For instance, the start date 1008 indicates that the start of the range is Jan. 1, 2020, and end date 1010 is Mar. 31, 2020.

In some embodiments, the factor 1000 may include a percentage change factor that may impose a change on a cash flow stream cash position by a certain percentage with a certain frequency (e.g., frequency 1012). "Percentage change factor" refers to a factor configured to change the cash flow for a cash flow stream by a predetermined percentage over time with a predefined frequency. For example, In one embodiment, the percentage change factor comprises a percentage increase, for example, 0.025%, with a frequency interval, such as each future pay period. For example, In one embodiment, the percentage change factor comprises a percentage decrease, for example, 0.025%, with frequency interval, such as each future pay period.

For example, the change may be an increase or a decrease in total value of the cash flow stream by a defined percentage. In some configurations, the factor 1000 may include a time shift factor that may change a cash flow stream cash position by an amount based on an adjustment to when a financial transaction is to be completed.

Figure 11:
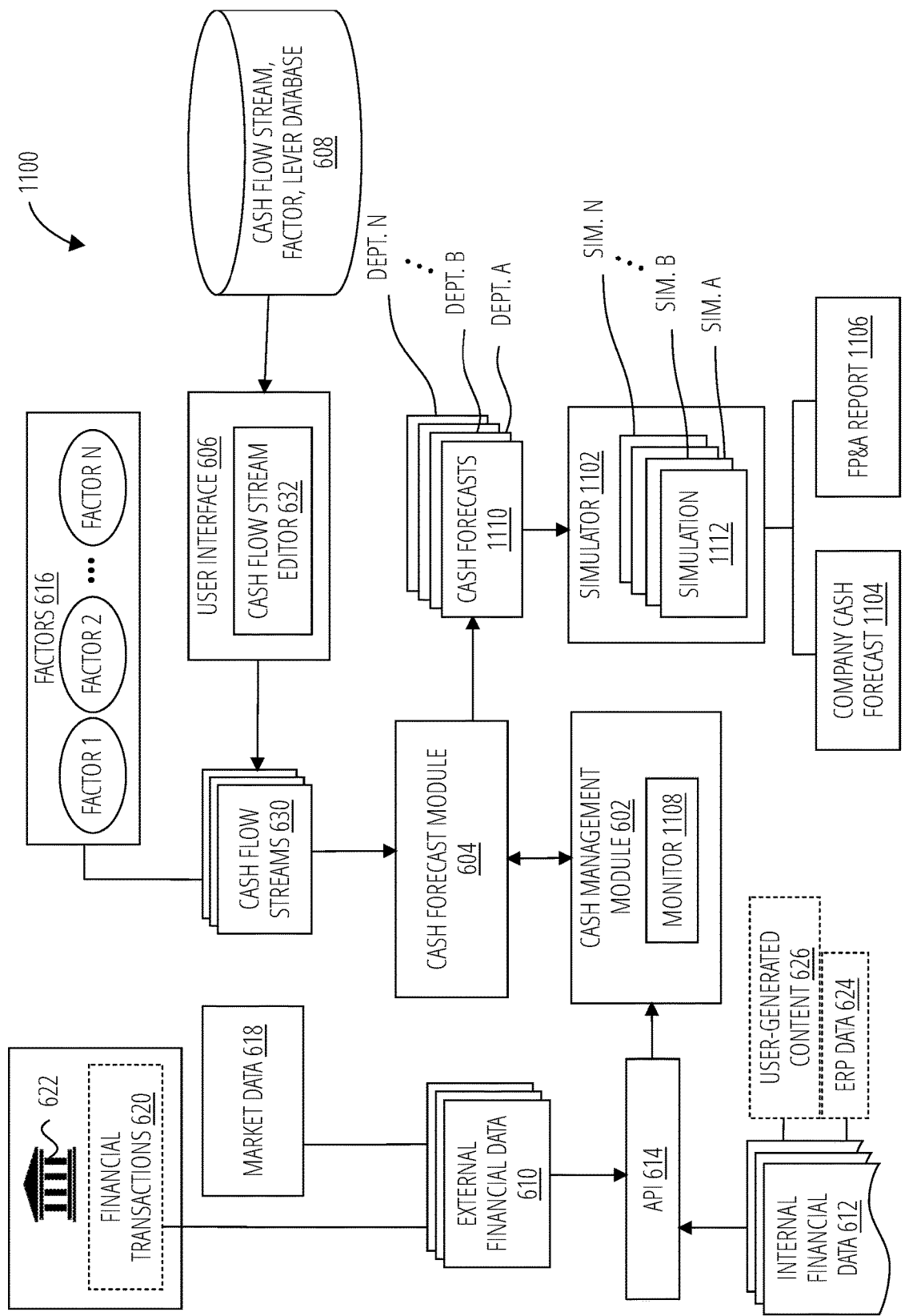
FIG. 11 illustrates a cash forecasting system 1100 in accordance with one embodiment.

FIG. 11 illustrates a cash forecasting system 1100 in accordance with one embodiment. The cash forecasting system 1100 may include a cash management module 602, a cash forecast module 604, a user interface 606, a cash flow stream, factor, lever database 608, similar in many respects to like numbered elements of FIG. 6. The cash forecasting system 1100, in one embodiment, includes a plurality of cash forecasts 1110 and a simulator 1102.

The cash forecast module 604 may communicate with the cash management module 602 to retrieve cash position data and financial transactions that correspond to the one or more cash flow streams 630. The cash forecast module 604 may generate the plurality of cash forecast 1110. In some configurations, the cash management module 602 may include a monitor 1108. The monitor 1108 may identify cash flow streams 630 from financial transactions collected by the cash management module 602. Alternatively, or in addition, the cash forecast module 604 may include the monitor 1108. In one embodiment, the monitor 1108 uses tags to identify cash flow streams 630.

The cash forecast module 604 provides the plurality of cash forecasts 1110 to a simulator 1102. The simulator 1102 may combine the plurality of cash forecasts 1110 into a simulation 1112 and generate a company cash forecast 1104 based on the plurality of cash forecasts 1110. "Simulation" refers to the representation of the behavior or characteristics of one system through the use of another system, especially a computer program designed for the purpose. (Search "simulation." on Dictionary.com. 2020. Accessed Feb. 4, 2020.)

"Company cash forecast" refers to a cash forecast that is representative of all cash related activities for a company. The simulator 1102 may generate a plurality of simulations from one or more cash forecasts 1110. In certain configurations, the simulator 1102 may generate an FP&A report 1106 from the one or more cash forecasts 1110.

In certain embodiments, the cash forecasting system 1100 may include a processor and a volatile memory media storing instructions that, when executed by the processor, cause the processor to perform certain operations. The instructions may cause the processor to retrieve historical financial transaction from a prior day over a network by way of an application programming interface (API 614) from a one or more of a financial institution 622 for each cash account of the company, and internal financial data 612 such as financial data from an enterprise resource planning (ERP) system, and user-generated content such as transaction records from an spread sheet.

The processor may be instructed to determine a relationship between historical financial transactions and a cash flow stream for a specific part of a company as defined by, or in, a forecast model, such as forecast model 704. The forecast model may include one or more cash flow stream 630 where each of the cash flow streams may include one or more one or more factors 616. The processor may be instructed to predict one or more future cash flows for the one or more cash flow streams defined by the forecast model by applying the relationship.

The processor may be instructed to generate a direct method generated cash forecast for a predefined future time period (e.g., next quarter, or next year) based on a direct method of financial cash flow process using the one or more future cash flows. "Direct method" refers to one of two accounting treatments used to generate a cash flow statement. The statement of cash flows direct method uses actual cash inflows and outflows from the company's operations, instead of modifying the operating section from accrual accounting to a cash basis. Accrual accounting recognizes revenue when it is earned versus when the payment is received from a customer.

Conversely, the cash flow direct method measures only the cash that's been received, which is typically from customers and the cash payments or outflows, such as to suppliers. The inflows and outflows are netted to arrive at the cash flow. The direct method is also known as the income statement method. (search "direct method" on investopedia.com. Sep. 19, 2019. Accessed Oct. 21, 2019). The processor may be instructed to present the direct method generated cash forecast to a user.

In certain embodiments, the 900 may display a revised direct method generated cash forecast in response to a daily change in one or more of historical financial transactions, ERP system financial data, and user-generated content.

"Direct method generated cash forecast" refers to a cash forecast generated using the direct method of accounting for cash.

Figure 12:
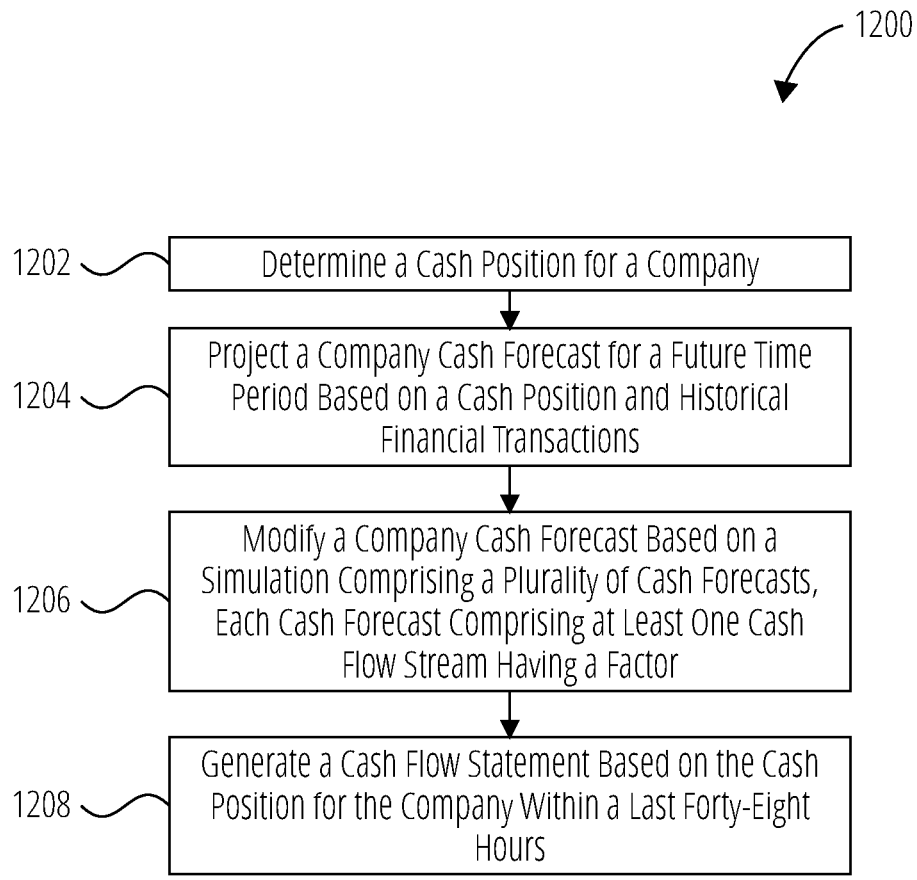
FIG. 12 illustrates a method 1200 in accordance with one embodiment.

FIG. 12 illustrates a method 1200 in accordance with one embodiment. In step 1202, the method 1200 determines a cash position for a company. In step 1204, the method 1200 projects a company cash forecast for a future time period based on the cash position and historical financial transactions. In step 1206, The method 1200 modifies the company cash forecast based on a simulation comprising a plurality of cash forecasts, each cash forecast comprising at least one cash flow stream having a factor. In step 1208, the method 1200 generates a cash flow statement based on a cash position for the company within the last forty-eight hours.

In some configurations, a step 1204 of projecting the company cash forecast may include gathering historical financial transactions from financial institutions, and ERP system financial data from ERP systems. Step 1204 may include modifying the cash position for the company on the basis that the future cash flows are directly correlated with past cash flows that generated the cash position.

In some configurations, the cash flow stream may include a cash uses stream. "Cash uses stream" refers to a cash flow stream configured to represent exclusively financial transactions, and or activities of a company, or a part of the company that "use" cash, that result in a debit to a financial account of the company, or a part of the company. In some configurations, the cash flow stream may include a cash sources stream. "Cash sources stream" refers to a cash flow stream configured to represent exclusively financial transactions, and or activities of a company, or a part of the company that supply cash, as a source of cash, that result in a credit to a financial account of the company, or a part of the company.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer program applications, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random-access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. An apparatus comprising:
   an ingest module operative on a first side of a de-coupling boundary, the ingest module comprising:
     a web integration service;
     a normalizing module configured to transform data signals from the web integration service into a normalized data set;
   an outflow module operative on a second side of the de-coupling boundary, the outflow module comprising:
     an indexing module configured to transform outputs of the normalizing module into a search index, the indexing module operative asynchronously from the normalizing module and the web integration service across the de-coupling boundary;
     an outflow engine dynamically configurable from the second side of the de-coupling boundary to filter outputs of the search index without signaling across the de-coupling boundary;
     wherein a push notification is applied across the decoupling boundary to trigger the indexing module to update the search index based on anchor tags in the normalized data set;
   a processor; and a volatile memory media storing instructions that, when executed by the processor, cause the processor to perform operations comprising:

operating the ingest module to retrieve historical financial transaction from a prior day over a network by way of an application programming interface from a one or more of a financial institution for each cash account of the company, an enterprise resource planning (ERP) system, user-generated content;

determining a relationship between historical financial transactions and a cash flow stream for a specific part of a company defined by a forecast model, the forecast model comprising one or more cash flow streams, each cash flow stream comprising one or more factors;

predicting one or more future cash flows for the one or more cash flow streams defined by the forecast model by applying the relationship;

generating a cash forecast for a predefined future time period based on a direct method of financial cash flow process using the one or more future cash flows;

operating the outflow engine responsive to a web application to generate and present the direct method generated cash forecast according to the anchor tags; and wherein in response to a daily change in one or more of historical financial transactions, ERP system financial data, and user-generated content, the apparatus is configured to display a revised direct method generated cash forecast.

2. The apparatus of claim 1, wherein the cash forecast comprises at least one of:
- a start date;
- an end date;
- an update frequency;
- at least one cash flow stream; and
- one or more levers.

3. The apparatus of claim 1, wherein the factor comprises:
- an event;
- at least one associated cash flow stream;
- a change;
- a frequency;
- a begin date; and
- an end date.

4. The apparatus of claim 1, wherein at least one of the cash flow streams comprises a combination of cash source financial transactions and cash use financial transactions.

5. The apparatus of claim 1, wherein the cash forecast comprises a consolidated cash forecast and wherein a user enters assumptions for the cash forecast by configuring the one or more cash flow streams for a specific part of a company.

\* \* \* \* \*